US006760360B1

(12) United States Patent
Kawai

(10) Patent No.: US 6,760,360 B1
(45) Date of Patent: Jul. 6, 2004

(54) DEVICE AND METHOD FOR FILTERING RECEIVED SIGNALS FOR MOBILE TELEPHONE SYSTEM

(75) Inventor: Hisashi Kawai, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/450,672

(22) Filed: Nov. 30, 1999

(30) Foreign Application Priority Data

Feb. 24, 1999 (JP) ............................................ 11-046088

(51) Int. Cl.[7] .......................... H04B 1/69; H04B 1/707; H04B 1/713
(52) U.S. Cl. ........................ 375/130; 375/142; 375/144; 375/148; 375/150; 375/343; 375/346
(58) Field of Search ................................. 375/130, 341, 375/200, 208, 142, 147, 148, 150, 343, 346; 370/342; 380/49

(56) References Cited

U.S. PATENT DOCUMENTS 5,982,763 A * 11/1999 Sato ........................... 370/342

6,366,625 B1 * 4/2002 Minami et al. ............. 375/341

FOREIGN PATENT DOCUMENTS

| JP | 10-257021 | 9/1998 |
|---|---|---|
| JP | 11-004213 | 1/1999 |
| JP | 11-017648 | 1/1999 |
| JP | 11-017649 | 1/1999 |
| JP | 11-068618 | 3/1999 |
| JP | 11-177947 | 7/1999 |
| WO | WO 98/47253 | 10/1998 |

* cited by examiner

Primary Examiner—Stephen Chin
Assistant Examiner—Curtis Odom
(74) Attorney, Agent, or Firm—Pillsbury Winthrop LLP

(57) ABSTRACT

A received signal averaging apparatus which includes an average operating section which averages input signals and outputs a filtered data, a data encoding section which encodes data lower than a threshold level and generates an encoded data, and an encoded data storing section which stores therein the encoded data outputted from the data encoding section, and the received signal averaging apparatus further includes a filtered data storing section for storing therein the filtered data and a data decoding section for decoding the encoded data stored in the encoded data storing section and outputs the data to the filtered data storing section.

31 Claims, 18 Drawing Sheets

(1) FIRST SYMBOL
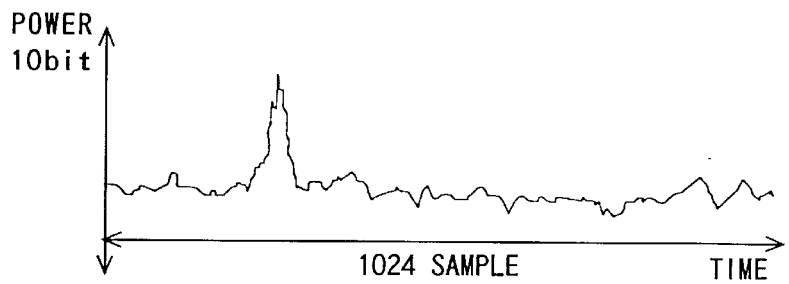
(2) SECOND SYMBOL
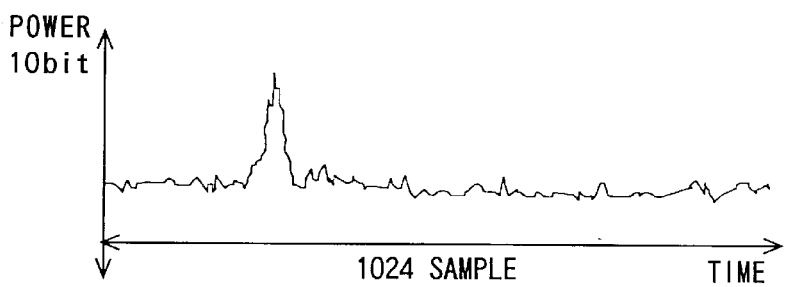
(3) THIRD SYMBOL
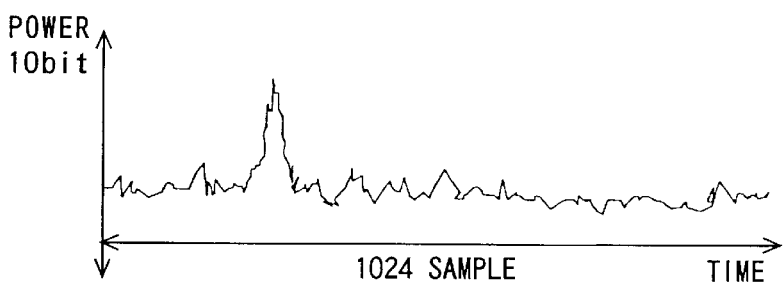
(4) AVERAGE
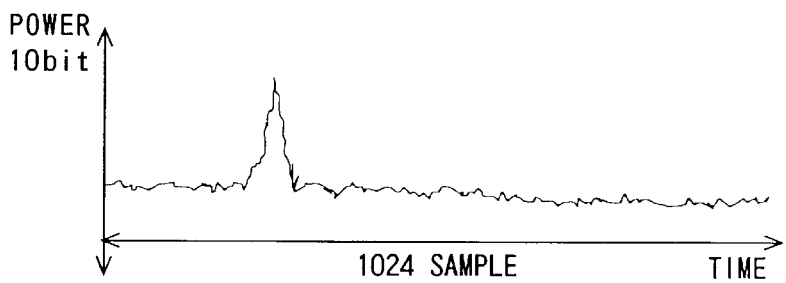
FIG. 6

|  | ENCODED DATA ADDRESS 94 | ENCODED DATA 100 ||
|---|---|---|---|
|  |  | ENCODED AVERAGE DATA 88 | ENCODED AVERAGE ADDRESS 90 |
| (C) → | 00h | AVERAGE | – |
| (a) → | 01h | 40h | 06h |
|  | 02h | 7Ah | 07h |
|  | 03h | 58h | 08h |
| (b) → | 04h | 65h | 12h |
|  | 05h | 5Ch | 13h |
|  | 06h | . | . |
|  | 07h | . | . |
|  | . | . | . |
|  | . | . | . |
|  | . | . | . |
|  | last-1 | . | . |
|  | last | . | . |

*FIG. 11*

| ENCODED DATA ADDRESS 94 | ENCODED DATA 100 ||
| --- | --- | --- |
| | ENCODED AVERAGE DATA 88 | ENCODED AVERAGE ADDRESS 90 |
| 00h | AVERAGE | – |
| 01h | 40h | 06h |
| 02h | 7Ah | 07h |
| 03h | 58h | 08h |
| 04h | 65h | 12h |
| 05h | 5Ch | 13h |
| 06h | . | . |
| 07h | . | . |
| . | . | . |
| . | . | . |
| . | . | . |
| last-1 | . | . |
| last | . | . |

(c) → 00h row
(a) → 01h, 02h, 03h rows
(b) → 04h, 05h rows

(a) SYMBOL

| T-1 | T | T+1 |

(b) ADDRESS SIGNAL

3FEh 3FFh 000h 001h 002h 003h 004h 005h 007h 008h 009h ... 3FDh 3FEh 3FFh 000h (c) WEIGHTED AVERAGE RESULT

02Fh 025h 02Fh 025h 032h 02Ch 0ABh 125h 004h 09Dh 019h 031h ... 05Ah 02Fh 043h 025h 032h (d) FIRST THRESHOLD VALUE

30h

| ADDRESS OF SMALL SCALE STORING SECTION | WEIGHTED AVERAGWE RESULT | ADDRESS SIGNAL |
|---|---|---|
| 000h | 032h | 001h |
| 001h | 0ABh | 003h |
| 002h | 125h | 004h |
| 003h | 09Dh | 005h |
| 004h | 031h | 009h |
| ... | ... | ... |
| S-2h | 05Ah | 3FDh |
| S-1h | 043h | 3FFh |
| Sh | | |

FIG.18A

| ADDRESS OF SMALL SCALE STORING SECTION | WEIGHTED AVARAGWE RESULT | ADDRESS SIGNAL |
|---|---|---|
| 000h | 032h | 001h |
| 001h | 0ABh | 003h |
| 002h | 125h | 004h |
| 003h | 09Dh | 005h |
| 004h | 031h | 009h |
| ... | ... | ... |
| S-2h | 05Ah | 3FDh |
| S-1h | 043h | 3FFh |
| Sh | | |

FIG.18B (1) OUTPUT SIGNAL OF SMALL SCALE STORING SECTION (a) ADDRESS SIGNAL: 001h, 113h, 004h, 005h, 009h, ..., 3FDh, 3FFh (b) WEIGHTED AVARAGE RESULT: 032h, 0ABh, 125h, 09Dh, 031h, ..., 05Ah, 043h (2) SYMBOL: T-1, T, T+1

(3) ADDRESS SIGNAL: 3FFh, 000h, 001h, 002h, 003h, 000h, 0ABh, 125h, 000h, 000h, 0ABh, 125h, 000h, ..., 000h, 004h, 005h, 007h, 008h, 009h, ..., 3FDh, 3FFh, 000h (4) OUTPUT OF EVEN-NUMBER DECODING SECTION (ODD-NUMBER): 000h, 000h, 032h, 000h, 0ABh, 125h, 09Dh, 000h, 000h, ..., 05Ah, 000h, 043h, 000h, 032h

DEVICE AND METHOD FOR FILTERING RECEIVED SIGNALS FOR MOBILE TELEPHONE SYSTEM

BACKGROUND OF THE INVENTION

This patent application claims priority based on a Japanese patent application, H11-46088 filed on Feb. 24, 1999, the contents of which are incorporated herein by reference.

1. Field of the Invention

The present invention relates generally to cellular telephone systems. More particularly, the present invention concerns a novel and improved device and method for filtering signals received by base transceiver station or mobile terminal for cellular telephone systems or satellite mobile telephone systems employing spread spectrum communication techniques, capable of reducing size or scale of memory capacity and circuitry in base transceiver station and mobile terminals.

2. Description of the Related Arts

There has been known the use of code division multiple access (CDMA) modulation techniques which is one of several techniques for facilitating communications in which a large number of system users are present. Other multiple access communication system techniques, such as time division multiple access (TDMA), frequency division multiple access (FDMA) and AM modulation schemes such as amplitude companded single side-band (ACSSB) are known in the art. However the spread spectrum modulation technique of CDMA has significant advantages over these modulation techniques for multiple access communication systems. The use of CDMA techniques in a multiple access communication system is disclosed, for example, in U.S. Pat. No. 4,901,307, entitled "SPREAD SPECTRUM MULTIPLE ACCESS COMMUNICATION SYSTEM USING SATELLITE OR TERRESTRIAL REPEATERS", of which the disclosure thereof is incorporated by reference.

In addition, the related art is also described in Japanese Patent Application No. Hei. 11-46088, from which the present application claims priority, and which is also incorporated herein by reference.

In the system, a base transceiver station receives SS (or spread spectrum) signals transmitted by each of the user terminals and identifies a particular user terminal by detecting a power level data of the received signals. For example, WO96-19048 discloses a circuit device for detecting the power level data of received signals.

FIG. 1 is a block diagram showing one example of a mobile cellular telephone system to which the received signal filtering device and method therefor according to the present invention is applicable. As shown in FIG. 1, a terminal user transmits and receives spread spectrum code signals by using a mobile cellular telephone 101 between a base transceiver station 102 through an antenna 103. The base transceiver station 102 is provided with an open air receiver amplifier (OA-RA) 104 by which the received signals are amplified. The amplifier 104 connects to a base transceiver apparatus (BTS) 105 in which the amplified signals are demodulated and processed. The received signals may contain therein voice data, audio data, image data, moving image data, JPEG data, or MPEG data. Those signals are modulated before transmitted by means of the code division multiple access (CDMA) communication techniques, and the received radio signals are demodulated either at a base band signal processor (described later) of the mobile cellular telephone 101 or at the base transceiver apparatus (BTS) of the base transceiver station 102.

On the other hand, another terminal user using a mobile cellular telephone 201 connecting to a personal computer PC receives SS (or spread spectrum) signals from and transmits SS signals to another base transceiver station 202 through an antenna 203. Similar to the first base transceiver station 102, the second base transceiver station 202 includes an open air receiver amplifier (OA-RA) 204 and a base transceiver apparatus (BTS) 205 having the same or similar function and operation.

Both the first and second base transceiver apparatus (BTS) 105 and 205 connect to a radio network controller equipment (RNC) 108 which is coupled to a multimedia signal processing equipment. The radio network controller equipment 108 coupling to a multimedia signal processing equipment (MPE) 110 and outputs signals to a mobile multimedia switching system (MMS) 115.

FIG. 2 is a block diagram showing the base transceiver station 102. As shown in FIG. 2, the base transceiver apparatus (BTS) 105 is provided with an amplifier block AMP and a modulation and demodulation block MDE. The amplifier block AMP includes a transmission power amplifier section (T-PA) 120 and an amplifier supervisory controller section (AMP-SC) 121. On the other hand, the modulation and demodulation block MDE is provided with a transmitter and receiver section (TRX) 122 connecting both to the transmission power amplifier section (T-PA) 120 and the amplifier supervisory controller section (AMP-SC) 121 of the amplifier block AMP. A base band signal processor section (BB) 123 connects to the transmitter and receiver section (TRX) 122, and an HWY interface section (HWY-INT) 124 connects to the base band signal processor section (BB) 123. The output of the HWY interface section (HWY-INF) 124 is transmitted to external devices (not shown) through a cable transmission passage.

Further, as shown in FIG. 2, a call processing controller section (CP-CNT) 125 connects to the transmitter and receiver section (TRX) 122, and the supervisory controller section 126 (SV-CNT) connects to the base band signal processor section (BB) 123. Further, an external interface section (EXT-INF) 127 coupling to the HWY interface section (HWY-INF) 124 is connected to external devices (not shown).

The transmitter and receiver section (TRX) 122 may be provided with a low-noise amplifier for amplifying the receiving and transmitting RF signals, and code-divides those signals into multiple signals. The transmitter and receiver section 122 further performs as an A/D converter for converting the base-band spread signals into digital or analog signals, which signals are quadrate-modulated to form RF signals.

The base band signal processor section (BB) 123, on the other hand, modulates or demodulates the signals with the spectrum spread technology. Further, the base band signal processor section 123 processes the received signal for extracting a power level data therefrom, and takes an average of the signal to correctly, accurately detect a peak value of the power level data.

FIG. 3 is a schematic view showing a block diagram of a mobile terminal station, that is, a cellular telephone.

As shown in FIG. 3, the mobile terminal station includes a transmitter and receiver section (TRX) 130 which transmits and receives signals through an antenna 132. The transmitter and receiver section 130 connects to a base band signal processor (BB) 134 in which the signals are modulated or demodulated. An external interface (EXT-INF) 136 connects to the base band signal processor 134. All the sections are controlled by a controller (MS-CNT) 138. The function and operation of the transmitter and receiver section (TRX) 130, the base band signal processor (BB) 134 and the external interface (EXT-INF) 136 of the mobile terminal station are similar to those of the base transceiver station 102, and the description is omitted here to avoid redundancy.

FIG. 4 is a schematic block diagram of a conventional receiver apparatus which receives spread spectrum (SS) signals modulated by means of the code division multiple access (CDMA) communication techniques.

When establishing a communication, signals from a user terminal cellular telephone must be first synchronized with a base transceiver station. Generally, a power level data is utilized to accomplish the synchronization.

As shown in FIG. 4, the receiver apparatus includes a complex correlating section 10 which receives spread spectrum signals of $I_D$ phase and $Q_D$ phase which are previously quadrate-modulated, takes places a reverse-spread operation for the received signals, and outputs the reverse-spread signals to a power extracting section 12 as received signals consisting of $I_{RD}$ and $Q_{RD}$ phases. The power extracting section 12 extracts power level data contained in the received signals and outputs a power data P to an average operating section 14. The average operating section 14 conducts an averaging operation with respect to the power data P received from the power extracting section 12, and the averaged power data is stored in a storing section 16 as an average data. Further, the average operating section 14 reads the power data stored in the storing section 16 and inputs newly received power data signals so that the average operating section 14 calculates out a new average data. A peak detecting section 18 receives the average data outputted from the average operating section 14 and detects a timing at which the power level of the average data is maximum, i.e., a peak. A control section 20 determines a timing at which a spread spectrum code signal generating section 22 generates and outputs a spread spectrum code signal in accordance with the peak timing detected by the peak detecting section 18, thereby to synchronize with the spread spectrum code signal contained in the received signals.

The conventional code-divided multiple accessing receiver apparatus includes a combination of the average operating section 14 and the storing section 16 for each of a plurality of system users, that is, terminal telephones. The control section 20 selects an average data of a required system user from the plurality of combinations of the average operating section 14 and the storing section 16.

FIG. 5 is a graph showing the power data extracted by the power extracting section 12 shown in FIG. 4. Generally, because the power data received at a moment contains noise as radio signal propagation passage always varies, the received, raw power data itself cannot be processed for the peak detection. Accordingly, the average operating section 14 inputs the power data P shown in FIG. 5 for a predetermined time period, then carries out the averaging operation and stores the average data in the storing section 16. Thereafter, the average operating section 14 processes the average data stored in the storing section 16 and a newly inputted power data to calculate out a new average data.

FIGS. 6 (1) through (4) are graphs showing the power data taken out by the power extracting section 12 for the average operation. The average operating section 14 inputs the power data from the power extracting section 12 for a predetermined numbers of symbols (three symbols in this example as shown in FIG. 6). Next, the symbols of the power data are subjected to the average operation at each sample so that an average power data of the three symbols is calculated.

In this context, one symbol consists of 256 chips and when one chip is subjected to a four-times over-sampling operation one symbol has 1,024 power data samples as shown in FIG. 6. The averaging operation is carried out for each of the 1,024 samples as a unit. If each of the average data is determined to have a word of 10 bit and when data of the three symbols for one system user is to be stored, 3 symbols×10 bit×1,024 samples=30,720 bit memory capacity per use is required.

In another case where one slot is set to have 10 symbols, the total amount of 102,400 bits of the memory capacity per user are required.

According to the conventional apparatus as described above, the apparatus requires a combination of the average operating section 14 and the storing section 16 for each system user. Accordingly, if a plenty numbers of system users are registered, total data capacity of the memory for storing therein the combination of sections becomes huge. Therefore, it results in increasing the size or scale of the memory capacity and the circuitry and raising the manufacturing cost. Particularly, recent demands are to demand a mobile cellular telephone more and more compact. Accordingly, much smaller memory capacity has been required.

SUMMARY OF THE INVENTION

The present invention was made in view of the foregoing drawbacks accompanying the conventional system and apparatus. Accordingly, an object of the present invention is to provide a received signal filtering device for coded signals capable of reducing size or scale of memory and circuitry.

Another object of the present invention is to provide a code division multiple access communication apparatus having a received signal filtering device capable of reducing size and scale of memory and circuitry.

In addition, another object of the present invention is to provide a method of filtering received signal modulated by the code division multiple access communication method which requires a small size or scale of memory and circuitry.

It is still another object of the present invention to provide a radio signal communication system including a receiver apparatus with a received signal filtering device which receives spread spectrum signals modulated by the code division multiple access transmission method, capable of reducing a size or scale of memory and circuitry.

The foregoing and other objects can be achieved by a provision of a received signal filtering device for mobile telephone system which, according to the present invention, includes a filtering operation device which inputs a received signal and a data encoding device coupled to an output side of the filtering operation device.

The foregoing and other objects can also be achieved by a provision of a received signal filtering device which, according to the present invention, includes an average operating section which averages power data contained in received signals and outputs an average power data, a data encoding section which encodes data lower than a threshold level into smaller scale and generates an encoded data, and an encoded data storing section which stores therein the encoded data outputted from the data encoding section. The received signal averaging device may further include an average data storing section for storing therein the average data and a data decoding section for decoding the encoded data stored in the encoded data storing section and outputs the data to the average data storing section.

The average operating section may calculate out a new average data on the basis of the average data stored in the average data storing section and a new power data contained in a newly received signal. The apparatus may preferably further include: a spread spectrum code signal generating section which generates an spread spectrum code signal used for taking place a reverse-spread operation for the received SS signals in accordance with the encoded data stored in the encoded data storing section; a-complex correlating section for the reverse-spread operation for the SS signals in accordance with the SS code signal generated by the spread spectrum code signal generating section; a power extracting section for extracting a power level data from the signal which is reverse-spreaded by the complex correlating section and outputting the power level data to the average operating section as a received signal; and a peak detecting section for detecting a timing at which the power level of the average data inputted from the average operating section. The spread spectrum code signal generating section may preferably determine the timing of generating the spread spectrum code signal in accordance with the timing detected by the peak detecting section.

The apparatus may preferably further include: a power extracting section for inputting the average data generated by the average operating section and outputting a power data of the average data; and a peak detecting section for detecting a timing at which the power data outputted from the power extracting section indicates a maximum value, i.e., a peak. In addition, the spread spectrum code signal generating section may generate a spread spectrum code signal at a timing in accordance with the timing detected by the peak detecting section.

The data encoding section may be provided with an average data address generating section which generates an average data address serving as an address for reading the average data out of the average data storing section. The data encoding section may select as an encoded average data a part of the average data which is higher than a predetermined threshold value, calculate out an average value of the other part of the average data which are lower than the threshold value, and output both the encoded average data and the average value as components of the encoded data.

The data encoding section is preferably provided with: a comparing section for comparing the average data inputted from the average data storing section with the predetermined threshold value and outputting a compared signal which represents whether the particular part of the average data is higher than the threshold value; a data holding section for holding, as components of the encoded data, an encoded average data obtained by selecting the average data higher than the threshold value and an encoded average address which is an average data address of the average data higher than the threshold value, in accordance with the compared signal; and an encoded average operating section for calculating the average value of the average data lower than the threshold value in accordance with the compared signal.

The data encoding section may preferably further include: a last address detecting section for detecting the last address which is the last one of the average data address for storing the encoded data in the encoded data storing section; a selecting section for outputting the encoded average data and the encoded average address as the encoded data when the last address detecting section does not detect the last address, and outputting the average value as the encoded data when the last address detecting section has detected the last address, in accordance with the output signal of the last address detecting section; and an encoded data address generating section for generating an encoded data address which represents an address for storing the encoded data in the encoded data storing section.

The data decoding section is preferably provided with: an average data address generating section for generating an average data address which serves as an address for storing the average data in the average data storing section; a comparing section inputting from the encoded data storing section the encoded average address which is the average data address when the average data is higher than the threshold value, and outputting a compared signal which represents whether the encoded average address coincides with the average data address; and an encoded data address generating section for generating as an encoded data address the address for reading out the encoded data stored in the encoded data storing section in accordance with the compared signal.

Further, the data decoding section may preferably further include: an average value holding section for holding an average value which is derived by averaging the average data lower than the threshold value inputted from the encoded data storing section; and a selecting section for outputting to the average data storing section as the average data the encoded average data which is the average data higher than the threshold value when the encoded average address coincides with the average data address, and outputting to the average data storing section as the average data the average value when the encoded average address does not coincide with the average data address, in accordance with the compared signal.

According to the code division multiple access receiver apparatus of the present invention, a couple of average operating sections may be provided for each of I-phase and Q-phase received signals derived by reverse-diffusing I-phase and Q-phase signals transmitted by means of the quadrate-modulation system. In addition, it is preferable that the encoded data storing section stores a plurality of encoded data and a plurality of encoded data is inputted in and outputted from the encoded data storing section in time series.

Further, the above and other objects can be achieved by a provision of a method of filtering received signals for a mobile telephone system, comprising steps of: inputting received radio data signal; filtering the inputted data and generating a filtered data; and encoding a part of said filtered data lower than a predetermined level and producing an encoded data.

The received signal filtering method according to the invention may further include a step of storing said filtered data.

In addition, the received signal filtering method according to the invention may further include a step of storing therein the encoded data.

Furthermore, the received signal filtering method according to the invention may further include steps of decoding the encoded data and outputting the decoded data.

Still further, in the received signal filtering method according to the invention, the filtering step may include a step of calculating a new filtered data from the filtered data as stored and a newly received signals.

Further, in the received signal filtering method according to the invention, the data encoding step may include steps of selecting a part of the filtered data higher than the threshold value as an encoded filtered data and calculating a filtered value of the other part of the filtered data lower than the threshold value, and outputting the encoded filtered data and the filtered value as components of the encoded data.

Still further, in the received signal filtering method according to the invention, the data encoding step may include steps of: generating a filtered data address serving as an address for reading the filtered data; comparing the filtered data with the predetermined threshold value and outputting a compared signal which represents whether the particular part of the filtered data is higher than the threshold value; holding, as components of the encoded data, an encoded filtered data obtained by selecting a part of the filtered data higher than the threshold value and an encoded filtered address which is a filtered data address of the filtered data higher than the threshold value, in accordance with the compared signal; and calculating the average value of the filtered data lower than the threshold value in accordance with the compared signal.

In addition, in the received signal filtering method according to the invention, the data encoding step may further include steps of: detecting the last address which is the last one of the filtered data address for storing the encoded data; outputting the encoded filtered data and the encoded filtered address as the encoded data when the last address detecting means does not detect the last address, and outputting the average value as the encoded data when the last address detecting means has detected the last address, in accordance with the output signal of the last address detecting means; and generating an encoded data address which represents an address for storing the encoded data.

Furthermore, in the received signal filtering method according to the invention, the data decoding step may include steps of: generating a filtered data address serving as an address for storing the filtered data; comparing the encoded average address which is the filtered data address when the filtered data with the threshold value; outputting a compared signal which represents whether the encoded average address coincides with the filtered data address; and generating as an encoded data address the address for reading out the encoded data in accordance with the compared signal.

In the received signal filtering method according to the invention, the data decoding step may include steps of: holding an average value which is derived by filtering the filtered data lower than the threshold value; and outputting as the filtered data the encoded filtered data which is the filtered data higher than the threshold value when said encoded filtered address coincides with the filtered data address, and outputting as the filtered data said filtered value when the encoded average address does not coincide with the filtered data address, in accordance with the compared signal.

In the received signal filtering method according to the invention, the filtering step may include an averaging step.

In the received data signal filtering device according to the invention, the filtering step may include a weighting step.

In addition, the above and other objects can be achieved by a provision of a radio communication system which, according to the present invention, include: at least one base transceiver station; at least one mobile terminal; wherein at least one of the base transceiver station and said mobile terminal comprises a received signal filtering device, the received signal filtering device including: a filtering operation device which inputs a received radio signal including a power data; and a power data encoding device coupled at least to an output side of the filtering operation device.

According to the invention, the radio communication system may further include a data storing device coupled in between the filtering operation device and the power data encoding device.

Further, in the radio communication system according to the invention, the data storing device may include an encoded data storing section and a filtered data storing section.

Still further, the radio communication system according to the invention may further include a data decoding device coupled at least to an input side of said filtered data storing device.

The received signal averaging or filtering device according to the present invention can be applied both to a mobile terminal, i.e., a cellular telephone, and to a base transceiver station of a mobile cellular telephone system or mobile satellite telephone system.

The summary of the present invention clause described above does not list up every features required by or desirable for the present invention. In other words, the sub-combination of those features are also covered by the scope of the invention.

BRIEF DESCRIPTION OF THE DRAWINGS

FIGS. 6 (1) to (4) are graphs showing the extracted power data and an averaged power data;

FIG. 11 is a table showing the content of an encoded data stored in the encoded data storing section shown in FIG. 9;

FIG. 14 is a table showing the content of the encoded data stored in the encoded data storing section before decoded by the data decoding section;

FIG. 17 is a timing chart showing timing of the data encoding operation according to the third embodiment of the present invention;

FIGS. 18A and 18B are a table and a timing chart, respectively, showing the decoding operation according to the third embodiment of the present invention.

DESCRIPTION OF THE PREFERRED EMBODIMENTS

The preferred embodiments of the present invention will now be described in detail with reference to accompanying drawings. The present invention is not limited to or by any of the embodiments described below, as the embodiments are merely examples to which the present invention is applicable. In addition, the combination of all of the features may not be necessary to achieve the present invention.

A first preferred embodiment of the present invention will be described with referenced to accompanying FIGS. 7 through 14, which is applied, as an example, to a code division multiple access receiver apparatus for the mobile cellular telephone system.

Figure 7:
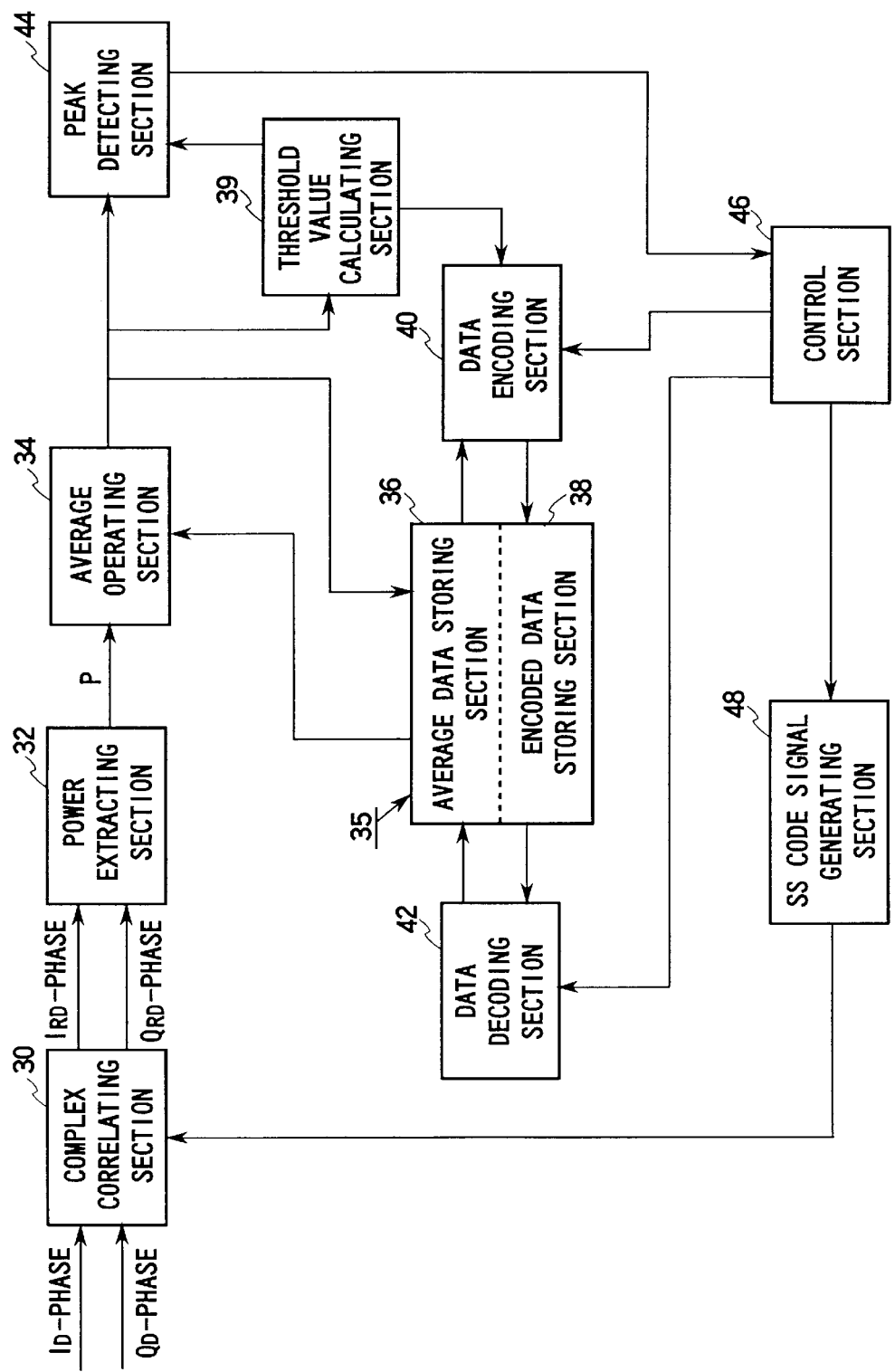
FIG. 7 is a block diagram of a code division multiple access receiver apparatus according to a first embodiment of the present invention.
Figure 8A:
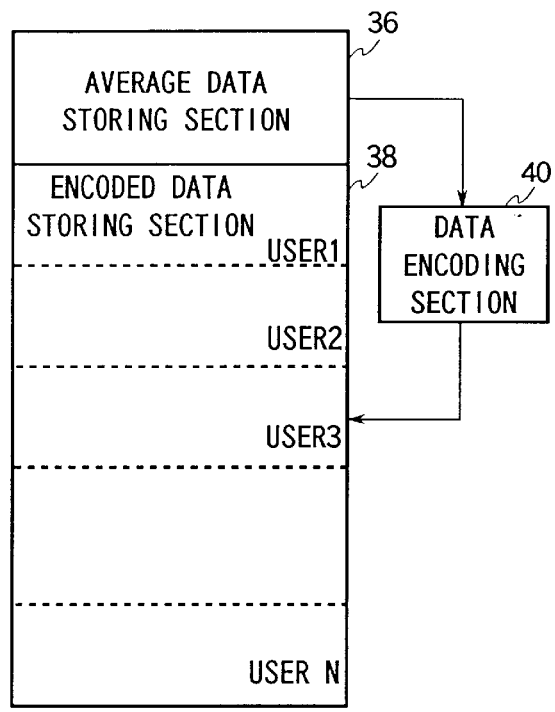
FIGS. 8A and 8B are block charts showing an average data storing section, an encoded data storing section, a data encoding section and a data decoding section of the code division multiple access receiver apparatus, respectively, shown in FIG. 7.
Figure 8B:
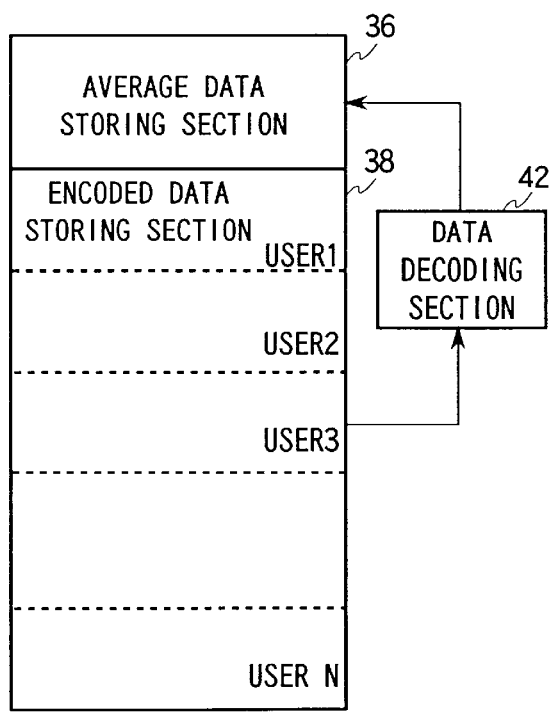
Figure 9:
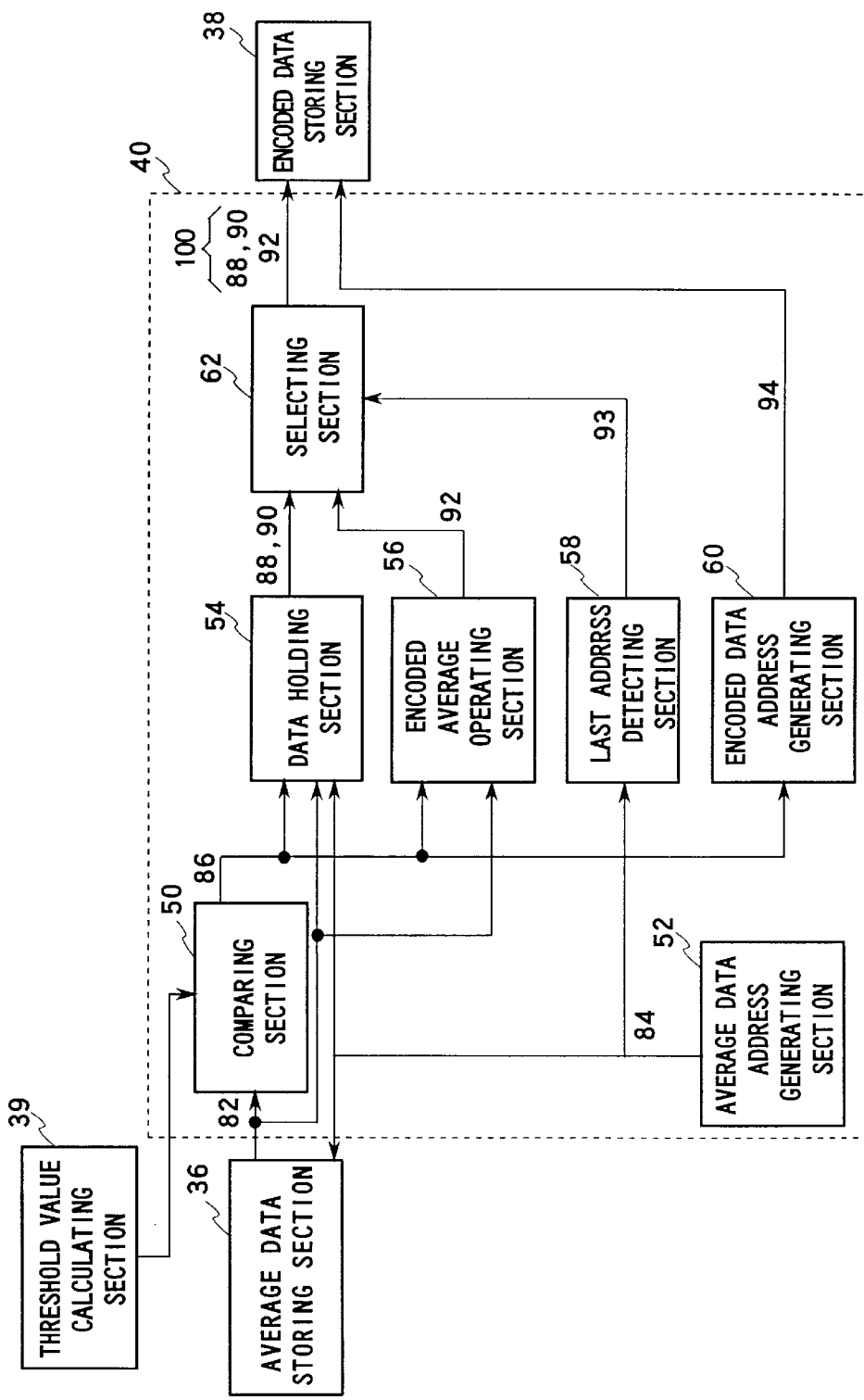
FIG. 9 is a block diagram showing the data encoding section according to the invention shown in FIG. 7.
Figure 10:
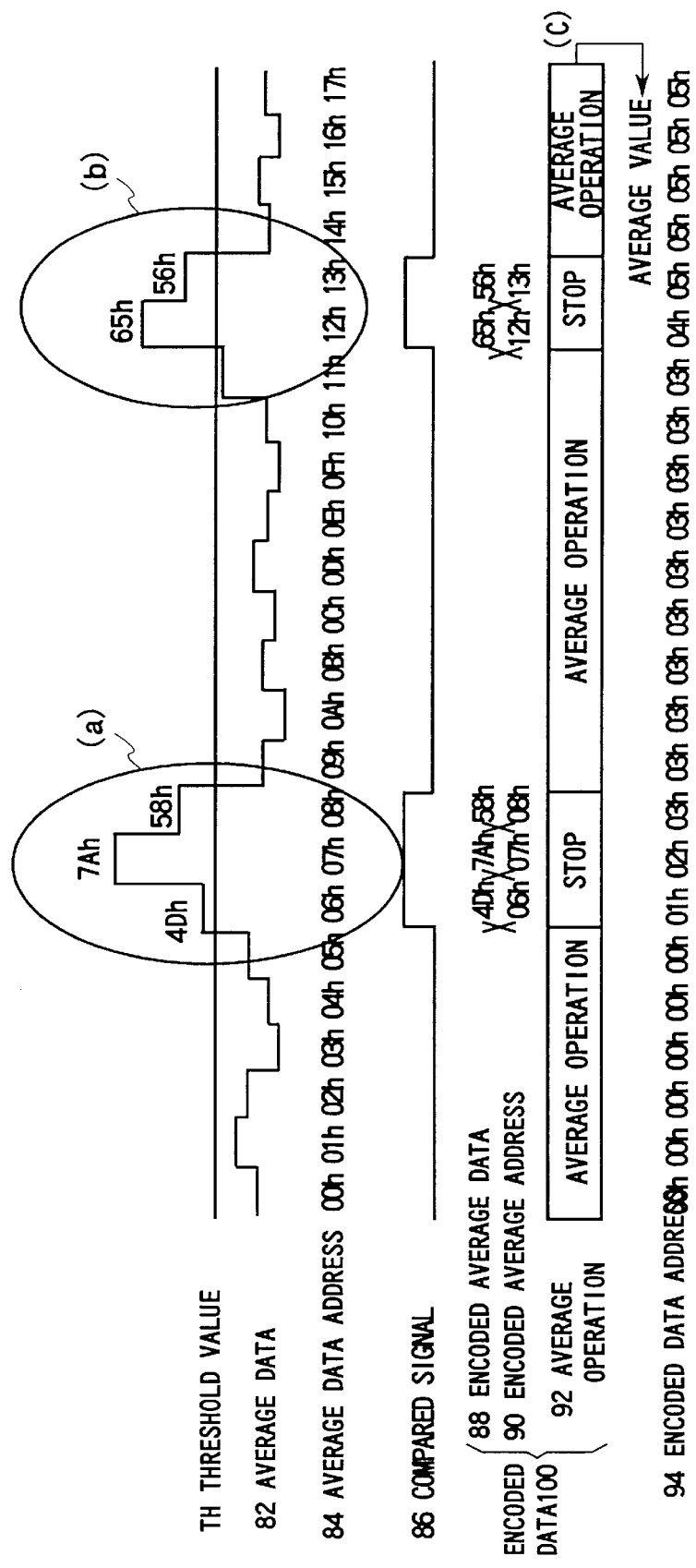
FIG. 10 is a timing chart showing the operation of the data encoding section shown in FIG. 9.
Figure 12:
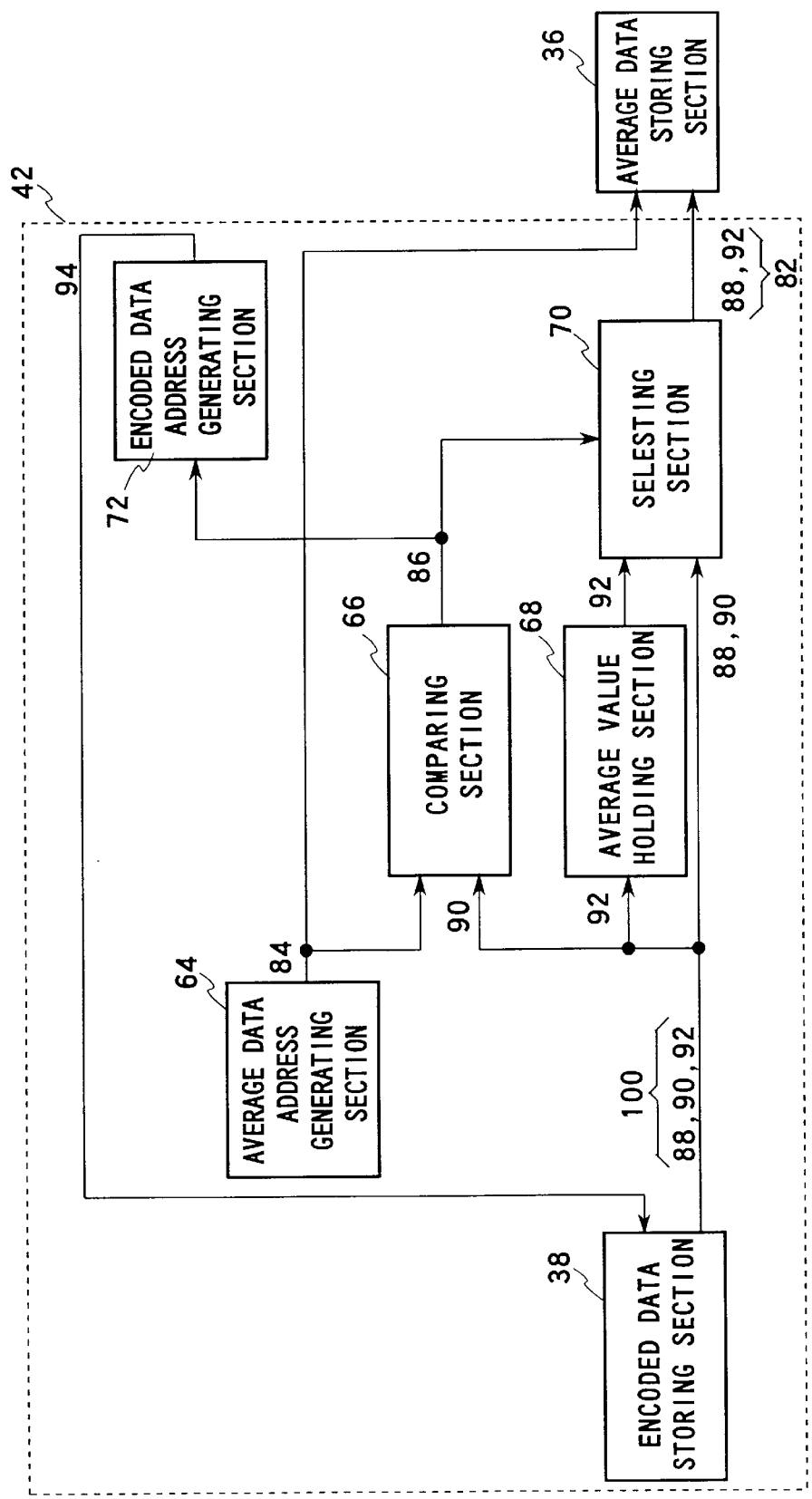
FIG. 12 is a block diagram showing the data decoding section shown in FIG. 9.
Figure 13:
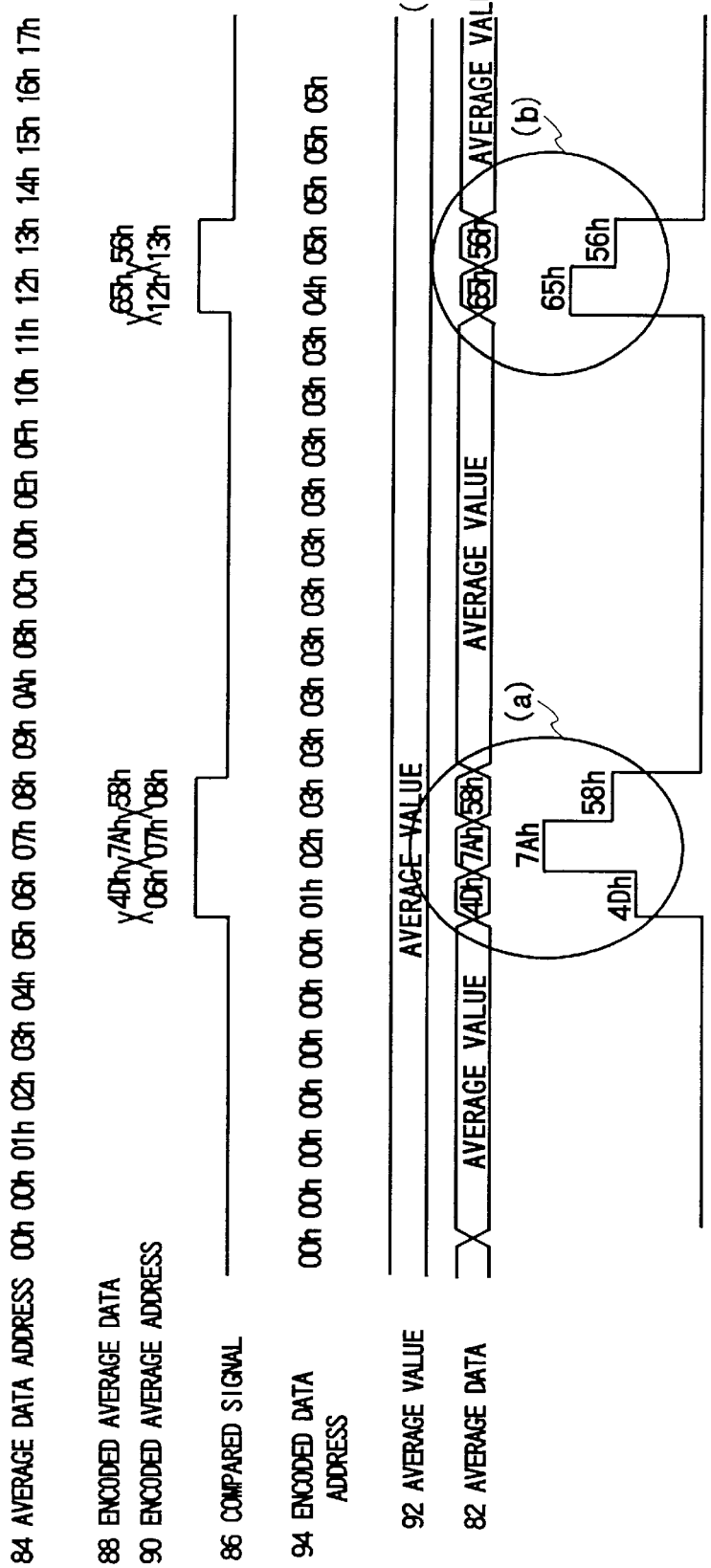
FIG. 13 is a timing chart showing the operation of the data decoding section shown in FIG. 12.

Specifically, FIG. 7 is a block diagram of a code division multiple access receiver apparatus according to the first embodiment of the invention, FIGS. 8A and 8B are block charts showing an average data storing section 36, an encoded data storing section 38, a data encoding section 40 and a data decoding section 42 of the code division multiple access receiver apparatus shown in FIG. 7, FIG. 9 is a block diagram showing the data encoding section shown in FIG. 7, FIG. 10 is a timing chart showing the operation of the data encoding section, FIG. 11 is a table showing the content of an encoded data stored in the encoded data storing section, FIG. 12 is a block diagram showing the data decoding section, FIG. 13 is a timing chart showing the operation of the data decoding section, and FIG. 14 is a table showing the content of the encoded data stored in the encoded data storing section before decoded by the data decoding section.

As shown in FIG. 7, a complex correlating section 30 receives $I_D$ phase and $Q_D$ phase of a spread spectrum code signal which is quadrate modulated previously, takes place the reverse-spread operation for the received signals, and outputs an reverse-spread signal consisting of $I_{RD}$ phase and $Q_{RD}$ phase to a power extracting section 32. The power extracting section 32 extracts a power data of the signals and generates an output signal as a received power data signal P to an average operating section 34. In this operation, since the $I_{RD}$ and $Q_{RD}$ signals which are reverse-spreaded by the complex correlating section 30 are rotated on a complex plane and both the power level of the $I_{RD}$ and $Q_{RD}$ phase signals may be high or only one of those phase signals may be high. Accordingly, the power extracting section 32 multiplexes the $I_{RD}$ phase signal with the $Q_{RD}$ phase signal at an initial operation stage and then processes the multiplexed signal to extract a power level data P therefrom, so that one of the phase signal would not extremely influence the extracted power level data P.

The average operating section 34 receives the power data signal P from the power extracting section 32 and operates the power data signal P to calculate out an average thereof. The average operating section 34 outputs an average data, as a result of the averaging operation, to an average data storing section 36 of a memory region 35 which stores therein the averaged power data. The average operating section 34 reads out the average data stored in the average data storing section 36 for calculating with a newly received power data signal to make a new average data. A data encoding section 40 encodes into smaller scale data signal portions of the averaged power data which are lower than a predetermined threshold value generated by a threshold value calculating section 39 and generates an encoded data in such a manner of an operation described in detail hereinbelow. An encoded data storing section 38 stores therein the encoded data which is an output of the data encoding section 40. The memory region 35 which is provided with the average data storing section 36 and the encoded data storing section 38 may be constituted by a flip-flop circuit. However, the memory region 35 having those storing sections 36 and 38 may be preferably composed of a random-access memory (or RAM) to save the size or scale of the hardware circuitry.

The threshold value calculating section 39 is coupled to the output side of the power extracting section 32 and inputs the power data therefrom averaged by the average operating section 34. The threshold value calculating section 39 determines a first threshold value outputted to a comparing section 50, shown in FIG. 9, of the data encoding section 40 and a second threshold value outputted to the peak detecting section 44, in accordance with the power data inputted from the power extracting section 32 through the average operating section 34. The first and second threshold values may be controlled to vary appropriately according to the signal/noise (or S/N) ratio of the received radio signals influenced by the condition during the propagation, such as tall buildings, other radio waves, dust in air and the like. Specifically, if the S/N ratio of the received signal is high, that is, low noise, the threshold value should be set high whereas the value should be set low if the S/N ratio is low, that is, much noise is contained in the received signal.

As described above, the average operating section 34 according to the present embodiment takes an average of the power data signal P as shown in FIG. 6. However, the invention is not limited thereto or thereby. The purpose of the averaging operation is to reduce noise contained in the power data signal P before detecting a peak value thereof. Accordingly, any other operation to reduce or filter the noise may be applicable to the present invention. For example, the highest and lowest values of each of the samples of the symbols are employed to take an average of the two, or merely a middle sample value of the symbols is stored and employed for the subsequent peak detection.

On the other hand, as shown in FIG. 7, the data decoding section 42 decodes the encoded data stored in the encoded data storing section 38 and outputs a decoded signal to the average data storing section 36. The peak detecting section 44 inputs the average data which is an output of the average operating section 34 and detects a timing at which the power level is maximum and outputs a timing signal to a control section 46.

The control section 46 outputs an instruction signal to a spread spectrum code signal generating section 48 in accordance with the timing signal detected by the peak detection section 44. Thus, the instruction signal of the control section 46 to the spread spectrum code signal generation section 48 designates a timing when the spread spectrum code signal is generated and outputted. Further, the control section 46 also outputs an instruction signal both to the data encoding section 40 and the data decoding section 42, which signal designates a timing when encoding operation of the average power data and the decoding operation of the encoded data are carried out. The spread spectrum code signal generating section 48 generates a spread spectrum code signal in accordance with the timing instruction signal generated by the control section 46, and outputs the spread spectrum code signal to the complex correlating section 30.

Figure 1:
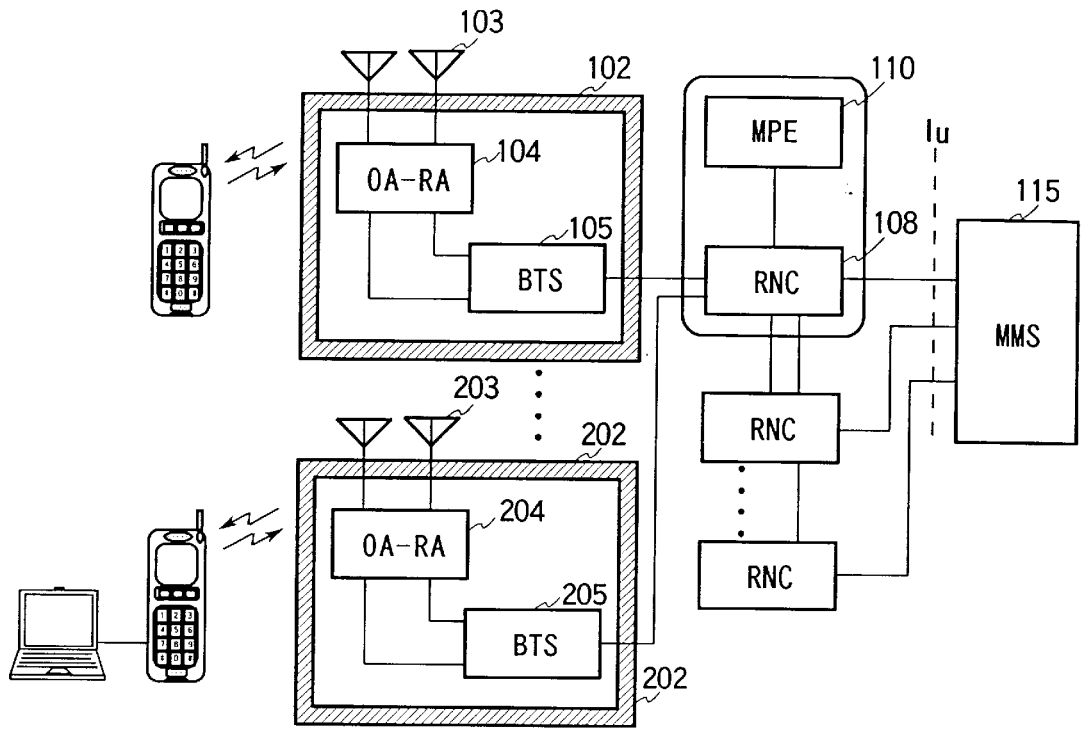
FIG. 1 is a block diagram showing one example of a mobile cellular telephone system to which the present invention is applicable.
Figure 2:
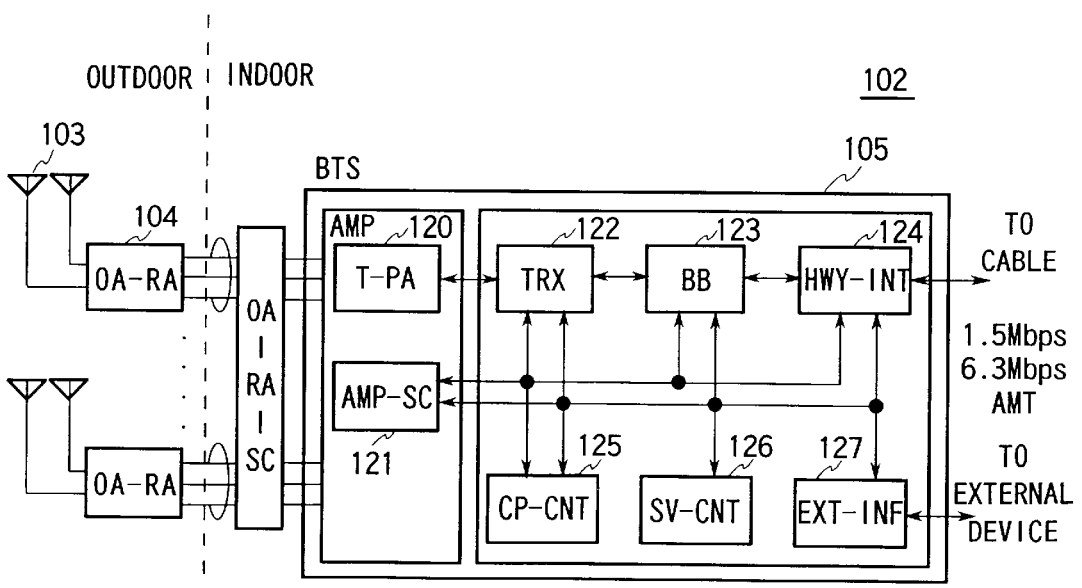
FIG. 2 is an enlarged view of a block diagram showing the base transceiver apparatus shown in FIG. 1.
Figure 3:
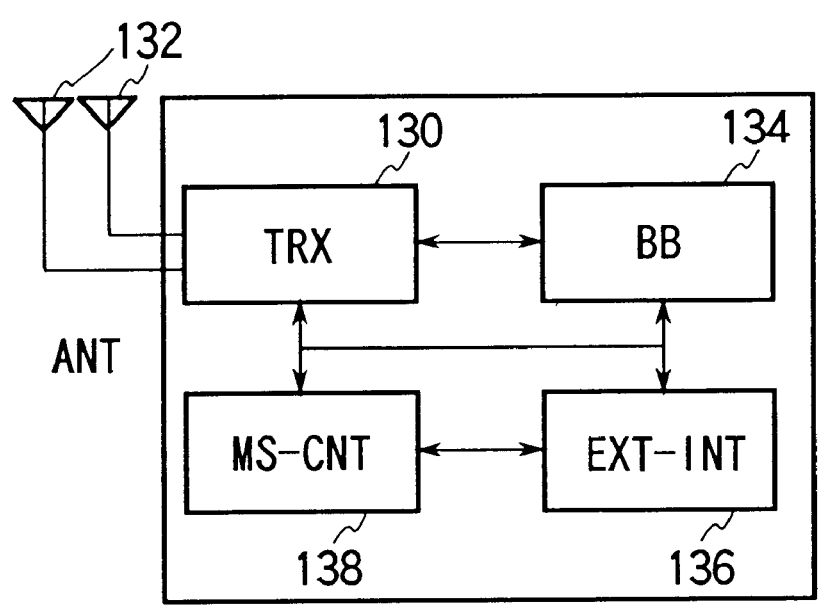
FIG. 3 is a schematic view showing a block diagram of a circuit installed in a mobile terminal, that is, a cellular telephone, shown in FIG. 1.
Figure 4:
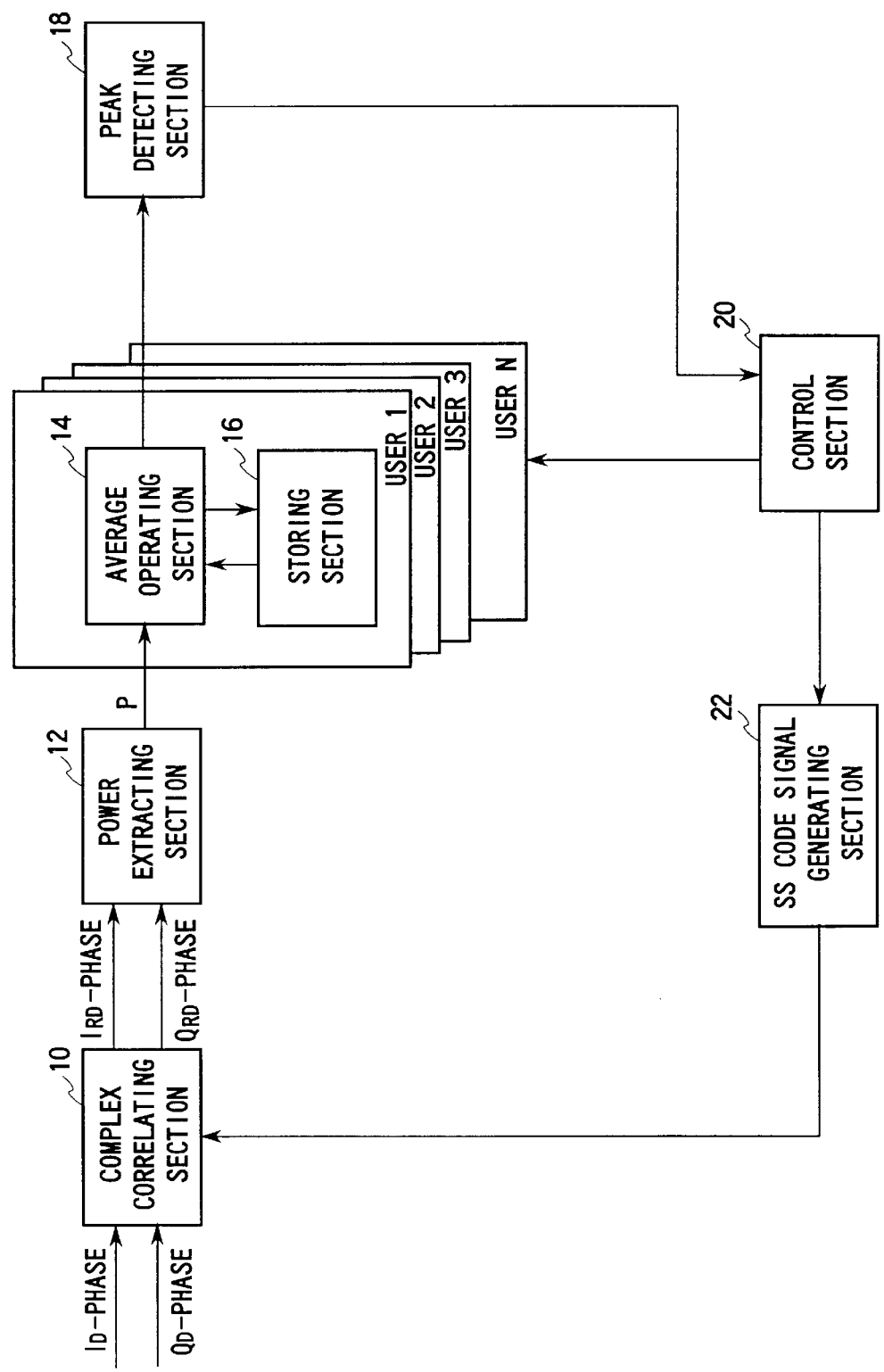
FIG. 4 is a schematic block diagram showing a conventional receiver apparatus for use in the code division multiple access communication system.
Figure 5:
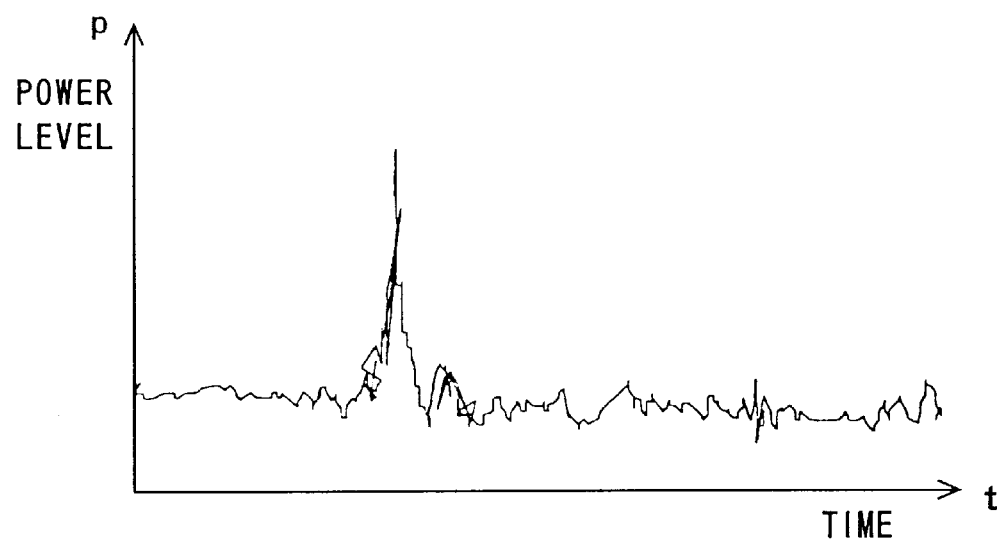
FIG. 5 is a graph showing a power data extracted by a power extracting section shown in FIG. 4.

FIGS. 8A and 8B show a control process of the average data storing section 36, encoded data storing section 38, data encoding section 40 and data decoding section 42 when the device manages the average data of a plurality of system users. As shown in FIG. 4, the conventional device requires a combination of the average operating section 14 and the storing section 16 for each of the system users. However, according to the present invention, as shown in FIGS. 7 and 8A, 8B, only a single average operating section 34 and a single average data storing section 36 are required for a plurality of system users because those sections are commonly employed.

As shown in FIG. 8A, the encoded data storing section 38 is provided with a plurality of regions for the plurality of users, and the encoded data for a particular user is stored in a respective region of the encoded data storing section 38. A part of the samples of the averaged power data, which is lower than the threshold value, is encoded into smaller scale by the data encoding section 40 and stored in the user region of the encoded data storing section 38 as an encoded data.

When the encoded data stored in the encoded data storing section 38 is read out, the necessary encoded data is decoded by the data decoding section 42 and the decoded data is outputted to the average data storing section 36. For example, when the receiver apparatus receives a signal from USER 3, as shown in FIG. 8, the data encoding section 40 carries out an encoding operation for the average power data stored in the average data storing section 36 and operates the encoded data to store same in a region for USER 3 of the encoded data storing section 38. On the other hand, during the decoding operation, the data decoding section 42 reads out the encoded data stored in the region for USER 3 of the encoded data storing section 38 to decode the data, and outputs the decoded data to the average data storing section 36 as shown in FIG. 8B. The encoding process and the decoding process for each system user are operated in time series.

The average data storing section 36 and the encoded data storing section 38 may be composed of a RAM, if preferable.

FIG. 9 is a block diagram showing the detailed structure of the data encoding section 40 according to the first embodiment of the present invention, and FIG. 10 is an operation timing chart of the data encoding section 40 shown in FIG. 9.

As shown in FIG. 9, the data encoding section 40 is provided with: a comparing section 50 for judging if a power level of an average data 82 of each sampling is higher than a threshold value TH generated by the threshold value calculating section 39, and the comparing section 50 outputting a compared signal 86; an average data address generating section 52 for generating an average data address 84 which serves as an address for reading out the average data 82 stored in the average data storing section 36; a data holding section 54, which inputs the compared signal 86, the average data 82 and the average data address 84, for selecting and holding an encoded average data 88 composed of a part of the average data 82 which is higher than the threshold value TH and holding an encoded average address 90 representing a part of the average data address 84 when the sampled average data 82 is higher than the threshold value TH; an encoded average operating section 56 for operating the parts of the average data 82 which are lower than the threshold value TH to calculate out an average value 92; a last address detecting section 58 for detecting a last address 93 which is the last one of the average data address 84 to be stored in the encoded data storing section 38; an encoded data address generating section 60 for generating an encoded data address 94 which serves as an address used when the encoded data storing section 38 stores therein an encoded data 100; and a selecting section 62 which outputs the average value 92 to the encoded data storing section 38 as the encoded data 100 when the last address detecting section 58 detects the last address 93.

The comparing section 50 operates to compare the average data 82 outputted from the average data storing section 36 with the predetermined threshold value TH received from the threshold value calculating section 39 and outputs the compared signal 86 representing whether or not the sample of the average data 82 is higher than the threshold value TH. The average data address generating section 52 generates the average data address 84 which serves as an address used for reading out the average data 82 from the average data storing section 36 and outputs the same signal to the data holding section 54 and the average data storing section 36. The data holding section 54 selects from the average data 82 inputted from the average data storing section 36 data which is higher than the threshold value TH in accordance with the compared signal 86 received from the comparing section 50. The data holding section 54 outputs the selected data to the selecting section 62 as an encoded average data 88. Further, the data holding section 54 picks up the average data address 84 of the average data 82 when the data is higher than the threshold value TH in accordance with the compared signal 86, and the holding section 54 outputs the selected data to the selecting section 62 as an encoded average address 90. The encoded average data 88 and the encoded average address 90 constitute an encoded data 100.

The encoded average operating section 56 calculates data out of the average data 82 inputted from the average data storing section 36, which data is lower than the threshold value TH, to take place the averaging operation in accordance with the compared signal 86 inputted from the comparing section 50. The encoded average operating section 56 outputs an average value 92 consisting of a mere single signal to the selecting section 62. The last address detecting section 58 detects the last address 93 which is the last one of the average data address 84 inputted from the average data address generating section 52, and outputs the detected last address 93 to the selecting section 62.

For example, when the average data 82 is subjected to the average processing for one symbol, an average value of the power data consisting of 1,024 samples is calculated for one symbol, because one symbol equals to 256 chips in a case where one chip is over-sampled for four-times resulting in 1,024 samples. Accordingly, the last address detecting section 58 detects out the 1,024th average data address.

The encoded data address generating section 60 inputs the compared signal 86 from the comparing section 50 and generates the encoded data address 94 representing address for storing the encoded data 100 in the encoded data storing section 38 in accordance with the compared signal 86, and outputs the address 94 to the encoded data storing section 38. The selecting section 62 inputs the encoded average data 88 and the encoded average address 90 from the data holding section 54, inputs the average value 92 from the encoded average operating section 56 and inputs the last address 93 from the last address detecting section 58. Then, the selecting section 62 outputs the encoded average data 88 and the encoded average address 90 as the encoded data 100 to the encoded data storing section 38 when the last address detecting section 58 does not detect the last address 93, and outputs the average value 92 as the encoded data 100 to the encoded data storing section 38 when the last address detecting section 58 detects the last address 93.

FIG. 10 is an operation timing chart showing the data processing by the data encoding section 40. The comparing section 50 outputs the compared signal 86 of level 1 when the average data 82 is higher than the threshold value TH, that is, the average data address 84 is 06h, 07h and 08h and 12h and 13h shown in FIG. 10. On the other hand, the comparing section 50 outputs the compared signal 86 of level 0 when the average data 82 is lower than the threshold value TH, that is, the average data address 84 is 00h through 05h, from 09h to 11h and from 14h to 17h shown in FIG. 10. When the compared signal 86 is level 1, the data holding section 54 selects average data 4Dh, 7Ah, 58h, 65h and 56h out of the average data 82 which data are higher than the threshold value TH, and outputs the selected data to the selecting section 62 as the encoded average data 88. Further, when the compared signal 86 is level 1, that is, when the average data 82 is higher than the threshold value TH, the data holding section 54 selects address data of 06h, 07h, 08h, 12h and 13h out of the average data address 84, and outputs the selected address to the selecting section 62 as the encoded average address 90.

The encoded average operating section 56 calculates an average value of the average data 82 when the compared signal 86 is level 0. Specifically, while the average data address 84 is from 00h to 05h, from 09h to 11h, and from 14h to 17h shown in FIG. 10 during which the compared signal 86 is level 0, the encoded average operating section 56 calculates out an average value of the average data 82. On the other hand, the encoded average operating section 56 stops the average calculation while the compared signal 86 is level 1. The encoded average operating section 56 continues the average calculation for the average data 82 which are lower than the threshold value TH until the last address detecting section 58 detects the last address 93. When the last address detecting section 58 detects the last address 93, the encoded average operating section 56 outputs the average value 92, which is the average value of the entire average data 82 below the threshold value TH, to the selecting section 62.

When the compared signal 86 is level 1, that is, for example, the average data address 84 is 06h in FIG. 10, the encoded data address generating section 60 adds 1 to address 00h of the encoded data address 94 corresponding to address 05h of the average data address 84 which is one address prior to 06h, and outputs the address 01h as an updated encoded data address 94. Thus, when the compared signal 86 is level 1, the encoded data address generating section 60 outputs as the encoded data address 94 the address which is derived by adding 1 to the current encoded data address 94. On the other hand, when the compared signal 86 is level 0, for example, the average data address 84 is 05h in FIG. 10, the encoded data address generating section 60 generates address 00h which is the same as the address of the encoded data address 94 corresponding to address 04h of the average data address 84 of one address before. In other words, when the compared signal 86 is level 0, the encoded data address generating section 60 generates the same address of the encoded data address 94 as that of one address before.

The selecting section 62 continues to output the encoded average data 88 and the encoded average address 90 to the encoded data storing section 38 until the last address detecting section 58 detects the last address 93. More specifically, as shown at marked part (a) in FIG. 10, the first group of the encoded average data 88, i.e., 4Dh, 7Ah and 58h and the corresponding group of the encoded average address 90 of 06h, 07h and 08h are outputted as a set (a). On the other hand, as shown at marked part (b), the next group of the encoded average data 88, i.e., 65h and 56h and the corresponding group of the encoded average address 90 of 12h and 13h are outputted as a set (b). The selecting section 62 outputs the average value 92 marked as (c) in FIG. 10 to the encoded data storing section 38 when the last address detecting section 58 detects the last address 93.

The threshold value TH may be varied in accordance with the S/N ratio of the received signal. That is, if the received signal has a good S/N ratio, or very low noise, the threshold value TH may be adjusted to be higher than normal. On the other hand, if the received signal has a bad S/N ratio, or much noise, the threshold value TH should be adjusted to be lower. The system watches the S/N ratio of the received signal to control the threshold value TH appropriately at any time.

FIG. 11 is a table showing the content of the encoded data stored in the encoded data storing section 38. As shown in FIG. 11, set (a) which is the first group of the encoded average data 88 outputted from the selecting section 62 as shown in FIG. 10 and set (b) which is the group of the encoded average address 90 are stored in the encoded data storing section 38 to correspond to the particular address of the encoded data address 94. Further, as shown at the left column of the table in FIG. 11, the average value 92 of set (c) received from the selecting section 62 is stored at address 00h of the encoded data address 94.

FIG. 12 is a block diagram showing the structure of the data decoding section 42 and FIG. 13 is a timing chart showing the operation of the data decoding section 42.

The data decoding section 42 is provided with: an average data address generating section 64 for generating an average data address 84 which serves as an address at which the average data storing section 36 stores therein an average data 82; a comparing section 66 for generating a compared signal 86 which represents whether the encoded average address 90 coincides with the average data address 84; an encoded data address generating section 72 for generating an encoded data address 94 which serves as an address at which the encoded data storing section 38 stores therein the encoded data 100; an average value holding section 68 for holding the average value 92; and a selecting section 70 which outputs the encoded average data 88 as an average data 82 when the encoded average address 90 coincides with the average data address 84, and outputs the average value 92 as the average data 82 when the encoded average address 90 does not coincide with the average data address 84.

The average data address generating section 64 generates the average data address 84 which is an address at which the average data storing section 36 stores therein the average data 82, and outputs the generated address to the comparing section 66 and the average data storing section 36. The comparing section 66 inputs the encoded average address 90 from the encoded data storing section 38 and also inputs the average data address 84 from the average data address generating section 64. The comparing section 66 outputs to the encoded data address generating section 72 and to the selecting section 70 the compared signal 86 which serves as a signal for determining if the encoded average address 90 coincides with the average data address 84.

The encoded data address generating section 72 inputs the compared signal 86 from the comparing section 66, and generates the encoded data address 94 which designates an address at which the encoded data storing section 38 stores therein the encoded data 100. The encoded data address 94 is inputted to the encoded data storing section 38. The average value holding section 68 holds the average value 92 inputted from the encoded data storing section 38, and outputs the average value to the selecting section 70. The selecting section 70 inputs the compared signal 86 from the comparing section 66 and inputs the average value 92 from the average value holding section 68, and also inputs the encoded average data 88 and the encoded average address 90 from the encoded data storing section 38. The selecting section 70 outputs the encoded average data 88 as an average data 82 to the average data storing section 36 when the encoded average address 90 coincides with the average data address 84 in accordance with the compared signal 86. On the other hand, the selecting section 70 outputs the average value 92 as the average data 82 to the average data storing section 36 when the encoded average address 90 does not coincides with the average data address 84 in accordance with the compared signal 86.

FIG. 13 is a timing chart showing the data operation by the data decoding section 42. When the encoded average address 90 coincides with the average data address 84, that is, when the average data address 84 is 06h, 07h and 08h and 12h and 13h shown in FIG. 13, the comparing section 66 outputs a compared signal of level 1. On the other hand, when the encoded average address 90 does not coincides with the average data address 84, that is, when the average data address 84 is from 00h to 05h, from 09h to 11h and from 14h to 17h shown in FIG. 13, the comparing section 66 outputs a signal 86 of level 0.

When the compared signal 86 is level 1, for example, when the average data address 84 is 06h in FIG. 13, the encoded data address generating section 72 adds 1 to address 00h of the encoded data address 94 corresponding to the address 05h of the average data address 84 of one address before, and generates a new address 01h of the encoded data address 94. Therefore, when the compared signal 86 is level 1, the encoded data address generating section 72 generates a new address of the encoded data address 94 which is 1 address added to the encoded data address 94 of one address before. On the other hand, when the compared signal 86 is level 0, for example, the average data address 84 is 05h in FIG. 13, the encoded data address generating section 72 generates the address 00h as the encoded data address 94 which is the same as the address 00h of the encoded data address 94 corresponding to the address 04h of the average data address 84 of one address before. Thus, when the compared signal 86 is level 0, the encoded data address generating section 72 generates as the encoded data address 94 the same address as the encoded data address 94 of one address before.

The average value holding section 68 inputs the average value 92 indicated as (c) in FIG. 13 from the encoded data storing section 38, and outputs the value to the selecting section 70. When the compared signal 86 is level 1, for example, when the average data address 84 is 06h, 07h and 08h in FIG. 13, the selecting section 70 inputs from the encoded data storing section 38 a data set (a) of the encoded average data 88 group, that is, 4Dh, 7Ah and 58h and also the encoded average address 90 group, that is, 06h, 07h and 08h, and then outputs the data groups to the average data storing section 36. Similarly, when the average data address 84 is 12h and 13h, the selecting section 70 inputs from the encoded data storing section 38 a data set (b) of the encoded average data 88 group, that is, 65h and 56h and also the encoded average address 90 group, that is, 12h and 13h, and then outputs the data groups to the average data storing section 36. On the other hand, when the compared signal 86 is level 0, for example, the average data address 84 is from 00h to 05h in FIG. 13, the selecting section 70 outputs the average value 92 inputted from the average value holding section 68 and indicated as (c) in FIG. 13 to the average data storing section 36.

FIG. 14 is a table showing the content of the encoded data 100 stored in the encoded data storing section 38 before decoded by the data decoding section 42. As shown in FIG. 14, the data groups sets (a) and (b) of the encoded average data 88 and the encoded average address 90 stored in the encoded data storing section 38 correspond to the respective encoded data address 94. Further, the average value 92 indicated as (c) outputting from the selecting section 70 is stored at address 00h of the encoded data address 94.

Figure 15:
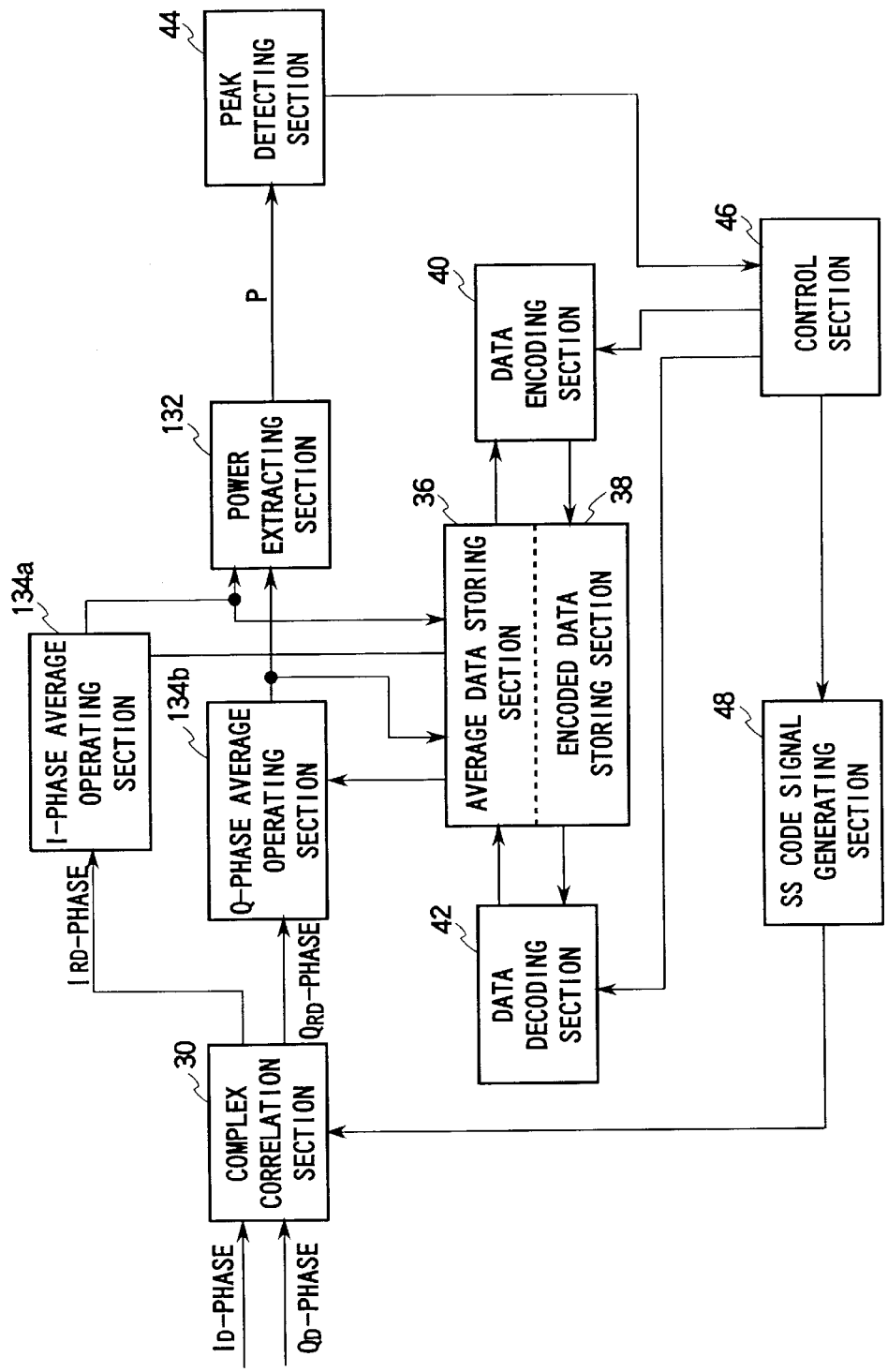
FIG. 15 is a block diagram of the code division multiple access receiver apparatus according to a second embodiment of the present invention.

FIG. 15 is a block diagram of the code division multiple access receiver apparatus according to a second embodiment of the present invention. The structure of the code division multiple access receiver apparatus shown in FIG. 15 is substantially the same as the first embodiment shown in FIG. 7 except the operation sequence and the structure of a power extracting section 132 and a couple of I-phase and Q-phase average operating sections 134a and 134b.

According to the second embodiment, received $I_{RD}$-phase and $Q_{RD}$-phase signals which are reverse-spreaded by the complex correlating section 30 are subjected to the average operation by I-phase average operating section 134a and Q-phase average operating section 134b, respectively. The I-phase average operating section 134a and Q-phase average operating section 134b output the averaged I-phase and Q-phase signals to the power extracting section 132 as an I-phase average data and a Q-phase average data, respectively. The power extracting section 132 receives the I-phase average data and Q-phase average data outputted from the I-phase average operating section 134a and the Q-phase average operating section 134b, respectively, to extract a power level data of the signals. The power extracting section 132 then outputs a power data P to a peak detecting section 44. The peak detecting section 44 detects a timing at which the power level of the power data P outputted by the power extracting section 132 is maximum.

The control section 46 outputs to the spread spectrum code signal generating section 48 an instruction signal designating a timing at which the spread spectrum code signal generating section 48 generates and outputs a spread spectrum code signal, in accordance with the peak timing signal detected by the peak detecting section 44. Further, the control section 46 outputs instruction signals to the data encoding section 40 and the data decoding section 42 so that the data encoding section 40 starts the encoding operation for the average data and that the data decoding section 42 starts the decoding operation for the encoded data. The spread spectrum code signal generating section 48 generates a spread spectrum code signal at a timing designated by the instruction signal received from the control section 46, and outputs the spread spectrum code signal to the complex correlating section 30.

According to the first embodiment of the present invention shown in FIG. 7, the power extracting section 32 receives the received signals of I-phase and Q-phase containing noise for extracting the power level and afterwards the power data is subjected to the average operation. Accordingly, the noise component of the average data may be enlarged. In contrast, according to the second embodiment of the present invention shown in FIG. 15, each of the received I-phase and Q-phase signals are respectively, separately subjected to the average operation before inputting to the power extracting section 132 for extracting therefrom the power level. Owing to the operation in the second embodiment, the noise component can be remarkably reduced. In the operation of the second embodiment, further, the peak of the power data can be detected accurately because the power levels of the averaged I-phase average data and the averaged Q-phase average data are extracted separately by the power extracting section 132.

According to the first and second embodiments of the present invention described above, the encoded average operating section 56 takes place the average operation with respect to the part of the averaged (or filtered) data which are lower than the threshold value TH as shown in FIG. 10. However, some other arrangements on this operation may be applicable to those embodiments.

For example, in a first arrangement, instead of averaging every samples of the averaged power data lower than the threshold value, only one sample of the average data at one address before the sample data exceeding the threshold value TH may be employed as a part of the encoded data 100 to be stored in the encoded data storing section 38. Thus, only a sample of the average data at 05h shown in FIG. 10 is selected and no averaging operation for the samples lower than the threshold value is carried out.

In a second arrangement, the highest and lowest samples of the average data lower than the threshold value are subjected to an averaging operation. In this case, for example, only the lowest average data at address 0Ah and the highest average data at address 11h shown in FIG. 10 are selected, and an average value of only the two average data are calculated out.

Still further, in a third arrangement, the average data of only one address before and one address after the average data higher than the threshold value TH are employed. Specifically, the average data at addresses 05h, 09h, 11h and 14h are selected, and an average value of those four average data calculated out.

The circuit design for the three possible arrangements outlined above would be the same as that of the first or second embodiment described above. Instead, the operation of the data encoding section 40, particularly the encoded average operating section 56 thereof, may be modified to adapt to the calculation of each of the three arrangements. Since those calculations themselves are not quite difficult, person skilled in the art could understand how to design and accomplish use program. Therefore, the detailed explanation is omitted here.

In any event, the above arrangement may be preferable because the process load for the average operation by the average operating section 34 can be reduced remarkably, and the speed for obtaining the synchronization can be increased.

Figure 16:
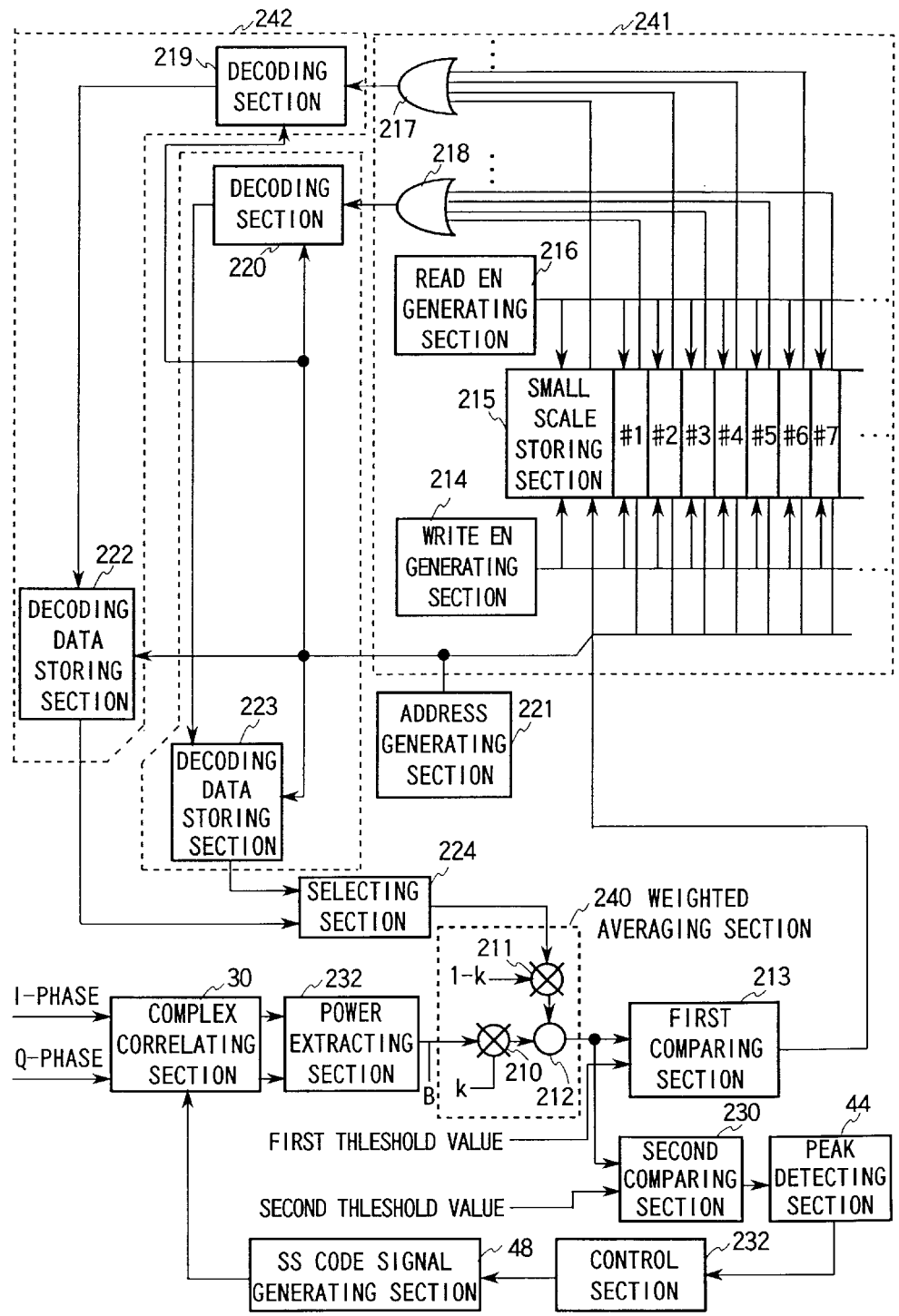
FIG. 16 is a block-and-circuit diagram showing an essential part of the code-division multiple access receiving apparatus according to a third embodiment of the present invention.

FIG. 16 is a block-and-circuit diagram showing an essential part of the code-division multiple access receiving apparatus according to a third embodiment of the present invention. In the figure drawings, like parts and components of the third embodiment are designated by the same reference numerals as those of the first and second embodiments described above, and the detailed description is omitted here.

The structure and the function of a spread spectrum code signal generating section 48, a complex correlating section 30, a power extracting section 32 and a peak detection section 44 are the same as those of the first and second embodiments.

As shown in FIG. 16, the apparatus according to the third embodiment includes: a weighted averaging section 240 coupled to an output side of the power extracting section 32; a first comparing section 213 which inputs an output signal of the weighted averaging section 240 and a first threshold value; an address generating section 221; an encoded data storing section 241 connecting to the first comparing section 213 and the address generating section 221; an even-number data decoding section 242 coupled to the encoded data storing section 241; an odd-number data decoding section 243 coupled to the encoded data storing section 241; a selecting section 224 connecting to each output side of the even-number data decoding section 242 and the odd-number data decoding section 243; and a second comparing section 230 which inputs an output signal of the weighted averaging section 240 and a second threshold value.

The weighted averaging section 240 is provided with a first multiplier 210, a second multiplier 211 and an adder 212. The weighted averaging section 240 inputs a power data P generated by the power extracting section 32. The inputted power data P is multiplied with a coefficient K by the first multiplier 210, and an output signal of the selecting section 224, i.e., one of the output signals of the even-number and odd-number data decoding sections 242 and 243, is multiplied with a coefficient 1-K by the second multiplier 211. The adder 212 adds both the outputs of the first multiplier 210 and the second multiplier 211 and outputs an weighted averaging signal to the first comparing section 213.

The first comparing section 213 inputs the weighted averaging signal outputted from the weighting averaging section 240 and a first threshold value generated by a first threshold generating device (not shown), compares the two signals, and outputs a part of the weighted averaging signal higher than the first threshold value.

The address generating section 221 outputs an address signal to both an even-number decoded data storing section 222 of the even-number data decoding section 242 and an odd-number decoded data storing section 223 of the odd-number data decoding section 243, so that the apparatus reads out data stored in the decoded data storing sections 222, 223 at an address inputted from the address generating section 221. Further, a small scale storing section 215 of the encoded data storing section 241 inputs and stores therein the address signal from the address generating section 221. The address signal generated by the address generating section synchronizes with the timing of the subject symbols.

The small scale storing section 215 inputs an output signal of the first comparing section 213 and the address signal corresponding to the output signal of the first comparing section, which address is generated by the address generating section 221. The small scale storing section 215 holds a part of the output signal of the first comparing section 213 higher than the first threshold value as well as the address signal corresponding to the output signal of the first comparing section to be stored therein.

The encoded data storing section 241 inputs an output signal of the first comparing section 213 and the address signal generated by the address generating section 221. The encoded data storing section 241 stores therein only a part of the weighted average data which is higher than the first threshold value along with the address signals corresponding to the weighted average data to be stored. Further, the encoded data storing section 241 outputs the stored data at a timing shifted from the timing at which the data is stored.

The even-number data decoding section 242 inputs the part of the weighted average data which is higher than the first threshold value and the address signal corresponding thereto, outputted by the encoded data storing section 241, and outputs a decoded signal as an average result which is originally provided. Similarly, the odd-number data decoding section 243 inputs the part of the weighted average data which is higher than the first threshold value and the address signal corresponding thereto, outputted by the encoded data storing section 241, and outputs a decoded signal as an average result as it is naturally. The selecting section 242 inputs an output signal of the even-number data decoding section 242 and an output signal of the odd-number data decoding section 243, and outputs one of the signals after selected.

The second comparing section 230 inputs the weighted average data outputted by the weighted averaging section 240 and a second threshold value generated by a second threshold value generating device (not shown). The second comparing section 230 compares the inputted weighted average data with the second threshold value, and output a part of the weighted average data which is higher than the second threshold value.

The peak detecting section 44 inputs an output signal, i.e., the part of the weighted average data higher than the second threshold value, and detects a peak of the weighted average data.

The control section 232 inputs and watches the detected peak of the weighted average data, and outputs an instruction signal to the spread spectrum code signal generating section 48, which signal represents a kind and phase of the spread spectrum signal.

As shown in FIG. 16, on the other hand, the encoded data storing section 241 is provided with a Write EN generating section 214 for generating a write enabling signal by which data is stored in the small scale storing section 215. When the enable signal is HIGH, data is stored in the storing section 215 whereas when the enable signal is LOW data is not stored. The small scale storing section 215 stores therein the address signal generated by the address generating section 221 and the output signal of the first comparing section 213 in accordance with the write enable signal produced by the Write EN generating section 214. The small scale storing section 215 can be designed to be much compact as compared with the even number storing section 222 or odd number storing section 223.

A Read EN generating section 216 generates a read enable signal by which data stored in the small scale storing section 215 can be read out. If f the read enable signal is HIGH the data stored in the small scale storing section is read out whereas when the enable signal is LOW the Read EN generating section 216 outputs a signal "0" by which no data reading operation takes place.

In addition, as shown in FIG. 16, the encoded data storing section 241 includes an even number OR circuit 217 which inputs signals from even numbered regions of the small scale storing section 215, carries out an OR operation and outputs the result of the OR operation to an even number decoding section 219 of the even number data decoding section 242. In this operation, since the output signal of the small scale storing section 215 outputs a signal "0" except when the read operation takes place, the output signals of the even number OR circuit 217 are just the output signals of the small scale storing section 215 when it is under the reading condition.

Similar to the even number OR circuit 217 described above, an odd number OR circuit 218 of the encoded data storing section 241 inputs signals from odd numbered regions of the small scale storing section 215, carries out an OR operation and outputs the result of the OR operation to an odd number decoding section 220 of the odd number data decoding section 243. In this operation, since the output signal of the small scale storing section 215 outputs a signal "0" except when the read operation takes place, the output signals of the odd number OR circuit 218 are just the output signals of the small scale storing section 215 when it is under the reading condition.

As shown in FIG. 16, the even number decoding section 219 of the even number data decoding section 242 inputs the output signal of the even number OR circuit 217 of the encoded data storing section 241 and the address signal generated by the address generating section 221. The even number decoding section 219 decodes the data stored in the small scale storing section 215 and outputs the decoded signal to the even number decoded data storing section 222 for storing the decoded data of even numbered regions of the small scale storing section 215. The even number decoded data storing section 222 inputs the output signals of the even number decoding section 219 and the address signal of the address generating section 221, and stores the output signals of the even number decoding section 219 at addresses represented by the address signal. Further, the even number decoding section 219 inputs the address signal generated by the address generating section 221 and reads out and outputs data stored at the addresses represented by the address signal.

Similarly, the odd number decoding section 220 of the odd number data decoding section 243 inputs the output signal of the odd number OR circuit 218 of the encoded data storing section 241 and the address signal generated by the address generating section 221. The odd number decoding section 220 decodes the data stored in the small scale storing section 215 and outputs the decoded signal to the odd number decoded data storing section 223 for storing the decoded data of odd numbered regions of the small scale storing section 215. The odd number decoded data storing section 223 inputs the output signals of the odd number decoding section 220 and the address signal of the address generating section 221, and stores the output signals of the odd number decoding section 220 at addresses represented by the address signal. Further, the odd number decoding section 220 inputs the address signal generated by the address generating section 221 and reads out and outputs data stored at the addresses represented by the address signal.

The even number decoding section 219, the odd number decoding section 220, the even number decoded data storing section 222 and the odd number decoded data storing section 223 may be composed by a RAM if desired.

The data encoding operation will be described hereinbelow with reference to FIG. 17 which is a timing chart showing timing of the data encoding operation.

(1) As shown in FIG. 17, when a symbol (a) is changed to the next one, the corresponding address signal (b) is set to be 000h where the weighted average data (c) is 025h. In this case, the weighted average data is not stored in the small scale storing section because the weighted average data of 025h is lower than the first threshold value 030h.

(2) Next, at the next address signal, i.e., 001h, the weighted average data at this address is 032h which is higher than the first threshold value 030h. Therefore, the weighted average data of 032h as well as the corresponding address signal of 001h are stored in the small scale storing section 215 at an address 000h.

(3) Next, at the next address signal, i.e., 002h, the weighted average data at this address is 02Ch which is lower than the first threshold value 030h. Therefore, the weighted average data is not stored in the small scale storing section 215.

(4) Next, at the next address signal, i.e., 003h, the weighted average data at this address is 0ABh which is higher than the first threshold value 030h. Therefore, the weighted average data of 0ABh as well as the corresponding address signal of 003h are stored in the small scale storing section 215 at an address 001h.

(5) Next, at the next address signal, i.e., 004h, the weighted average data at this address is 125h which is higher than the first threshold value 030h. Therefore, the weighted average data of 125h as well as the corresponding address signal of 004h are stored in the small scale storing section 215 at an address 002h.

(6) . . . (continued)

As described above, the small scale storing section 215 stores therein only a part of the weighted average data which is higher than the first threshold value along with the corresponding address signal. Therefore, the memory capacity of the storing section can be remarkably minimized.

The data decoding operation of the code division multiple access receiving apparatus according to the third embodiment will be described in detail with reference to FIG. 16 and FIGS. 18A and 18B.

FIGS. 18A and 18B are a table and a timing chart, respectively, showing the decoding operation according to the third embodiment of the present invention.

The data decoding operation is carried out by the address generating section 221, the encoded data storing section 241 and the data decoding sections 242, 243 shown in FIG. 16.

Now it is supposed that the small scale storing section 215 stores therein data shown in the table of FIG. 18A. In accordance with the enable signal outputted by the Read EN generating section 216, the small scale storing section 215 outputs "0" signal when the enable signal is LOW, while it outputs the weighted average data (b) and the corresponding address signal (a) stored therein when the enable signal is HIGH as illustrated at a part (1) in FIG. 18B. Both the even number OR circuit 217 and the odd number OR circuit 218 input the output signals of the small scale storing section 215 and conducts an OR operation. A single enable signal which is outputted by the Read EN generating section 216 corresponds to each of the regions of the small scale storing section 215.

In the third embodiment, ten regions of the small scale storing section 215 are provided and, accordingly, there are ten different enable signals prepared for the third embodiment. The enable signals are so controlled that all of the five enable signals for the even number are not HIGH at the same time and also that all of the other five enable signals for the odd number are not HIGH at the same time. Accordingly, the even number OR circuit 217 inputs only one line out of five lines connecting to the small scale storing section 215 through which the weighted average data and the corresponding address signal are transmitted, and a signal "0" is inputted through the other four lines. Therefore, the even number OR circuit 217 outputs the weighted average data and the corresponding address signal which are read out from the small scale storing section 215 of the even number the enable signal of which is HIGH. Similarly, the odd number OR circuit 218 inputs only one line out of five lines connecting to the small scale storing section 215 through which the weighted average data and the corresponding address signal are transmitted, and a signal "0" is inputted through the other four lines. Therefore, the odd number OR circuit 218 outputs the weighted average:data and the corresponding address signal which are read out from the small scale storing section 215 of the odd number the enable signal of which is HIGH.

The address generating section 221 outputs the address signal shown at a part (3) in FIG. 18B. The timing of the address signal (3) synchronizes with the timing of the symbol (2) as shown in FIG. 18B. More specifically, when the symbol (2) changes to the next one, the address signal (3) at the timing is reset to be 000h which is incremented up to 3FFh until the symbol (2) turns to be the next one where the address signal is reset to be 000h again.

The even number decoding section 219 inputs the output signal (1) of the even number OR circuit 217 and the address signal (3) outputted by the address generating section 221, and carries out the decoding operation. More specifically, the even number decoding section 219 compares the address portion of the output signal of the even number OR circuit 217 with the address signal inputting from the address generating section 221. The even number decoding section 219 outputs a signal of "0" if those addresses do not coincide with each other, whereas it outputs the weighted average data portion of the output signal of the even number OR circuit 217 if the two address signals do coincide with each other. After that, the address at which the data in the small scale storing section 215 is up by 1.

The even number storing section 222 inputs an output signal (4) in FIG. 18B of the even number decoding section 219 and the address signal of the address generating section 221, and stores therein the output signal of the even number decoding section 219 at an address represented by the input address signal. Further, the data is read out from the even number storing section 222 at the address represented by the address signal outputted by the address generating section 221.

The data decoding operation will now be described in more detail with reference to FIG. 18B.

(1) As shown in FIG. 18B, when the symbol turns to T, the address signal 000h at a part (3) in FIG. 18 generated by the address generating section 221 is compared with the address signal 001h at a part (1) (a) which is a part of the output signal of the even number OR circuit 217. As apparent in FIG. 18B, the addresses do not coincide with each other. Accordingly, the even number decoding section 219 outputs a 0h signal.

(2) Next, the address signal 001h at a part (3) outputted by the address generating section 221 is compared with the address 001h at a part (1) (a) which is a part of the output signal of the even number OR circuit 217. Because both the addresses coincide with each other as shown in FIG. 18, the even number decoding section 219 outputs the weighted average data 032h at apart (1) (b) corresponding to the address 001h outputted by the small scale storing section 215. In addition, the even number decoding section 219 outputs an instruction signal to the small scale storing section 215 to output the data stored at the address 001h.

(3) Next, data stored in the small scale storing section 215 at an address 001h thereof is outputted to the even number OR circuit 217. Then, an address signal 002h which is an output of the address generating section 221 is compared with an address 003h which is a part of the output signal of the even number OR circuit 217. As those two addresses do not coincide with each other, the even number decoding section 219 outputs a 0h signal.

(4) Next, the address signal 003h at a part (3) outputted by the address generating section 221 is compared with the address 003h at a part (1) (a) which is a part of the output signal of the even number OR circuit 217. Because both the addresses coincide with each other as shown in FIG. 18B, the even number decoding section 219 outputs the weighted average data 0ABh at apart (1) (b) corresponding to the address 003h outputted by the small scale storing section 215. In addition, the even number decoding section 219 outputs an instruction signal to the small scale storing section 215 to output the data stored at the address 002h.

(5) Next, data stored in the small scale storing section 215 at an address 002h thereof is outputted to the even number OR circuit 217. Then, an address signal 004h which is an output of the address generating section 221 is compared with an address 004h which is a part of the output signal of the even number OR circuit 217. As those two addresses coincide with each other as shown in FIG. 18B, the even number decoding section 219 outputs the weighted average data 125h at a part (1) (b) corresponding to the address 004h outputted by the small scale storing section 215. In addition, the even number decoding section 219 outputs an instruction signal to the small scale storing section 215 to output the data stored at the address 003h.

(6) Next, data stored in the small scale storing section 215 at an address 003h thereof is outputted to the even number OR circuit 217. Then, an address signal 005h which is an output of the address generating section 221 is compared with an address 005h which is a part of the output signal of the even number OR circuit 217. As those two addresses coincide with each other as shown in FIG. 18B, the even number decoding section 219 outputs the weighted average data 09Dh at a part (1) (b) corresponding to the address 005h outputted by the small scale storing section 215. In addition, the even number decoding section 219 outputs an instruction signal to the small scale storing section 215 to output the data stored at the address 004h.

(7) . . . (continued)

As described above, the encoded data stored in the small scale storing section 215 can be decoded to have the same size as the original data have before encoded.

The operation of the odd number decoding section 220 and the odd number storing section 223 is the same as that of the even number decoding section 219 and the even number storing section 222, respectively. Accordingly, the description is omitted here to avoid redundancy.

The selecting section 224 inputs the output signal of the even number storing section 222 and an output signal of the odd number storing section 223, and selects one of the signals to output therefrom.

Next, the circuit operation of the code division multiple access receiver apparatus will now be described with reference to FIG. 16 and FIG. 19.

Figure 19:
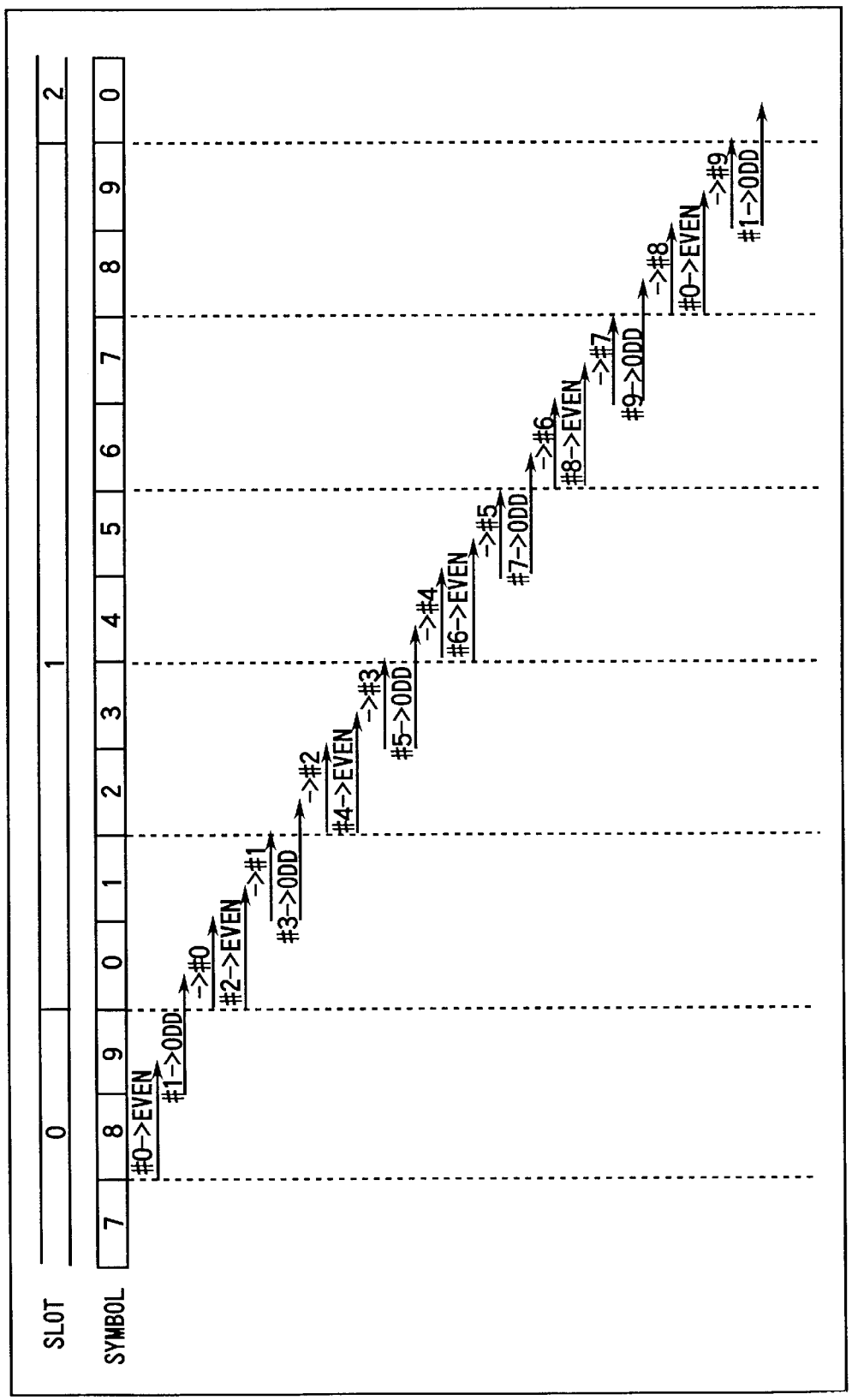
FIG. 19 is a timing chart showing the operation of the code division multiple access receiver apparatus according to the third embodiment of the present invention.

FIG. 19 is a timing chart showing the operation of the code division multiple access receiver apparatus according to the third embodiment of the present invention.

(1) First, as an initial step, on a symbol 8 of slot 0, the encoded data stored in the small scale storing section 215 at a region #0 is decoded in the even number decoding section 219.

(2) Next, on a symbol 9 of slot 0, the encoded data stored in the small scale storing section 215 at a region #1 is decoded in the odd number decoding section 220.

(3) Next, on a symbol 0 of slot 1, the output signal of the even number decoding section 219, which previously decodes data stored in the small scale storing section 215 at a region #0, and the power data P which is an output of the power extracting section 32 are subjected to the weighting averaging operation by the weighted averaging section 240. Then the weighted average data which is higher than the first threshold value and the corresponding address signal are stored in the small scale storing section 215 at an region #0. At the same time, in addition, the encoded data stored in the small scale storing section 215 at a region #2 is decoded in the even number decoding section 219.

(4) Next, on a symbol 1 of slot 1, the output signal of the odd number decoding section 220, which previously decodes data stored in the small scale storing section 215 at a region #1, and the power data P which is an output of the power extracting section 32 are subjected to the weighting averaging operation by the weighted averaging section 240. Then the weighted average data which is higher than the first threshold value and the corresponding address signal are stored in the small scale storing section 215 at an region #1. At the same time, in addition, the encoded data stored in the small scale storing section 215 at a region #3 is decoded in the odd number decoding section 220.

(5) Next, on a symbol 2 of slot 1, the output signal of the even number decoding section 219, which previously decodes data stored in the small scale storing section 215 at a region #2, and the power data P which is an output of the power extracting section 32 are subjected to the weighting averaging operation by the weighted averaging section 240. Then the weighted average data which is higher than the first threshold value and the corresponding address signal are stored in the small scale storing section 215 at an region #2. At the same time, in addition, the encoded data stored in the small scale storing section 215 at a region #4 is decoded in the even number decoding section 219.

(6) Next, on a symbol 3 of slot 1, the output signal of the odd number decoding section 220, which previously decodes data stored in the small scale storing section 215 at a region #3, and the power data P which is an output of the power extracting section 32 are subjected to the weighting averaging operation by the weighted averaging section 240. Then the weighted average data which is higher than the first threshold value and the corresponding address signal are stored in the small scale storing section 215 at an region #3. At the same time, in addition, the encoded data stored in the small scale storing section 215 at a region #5 is decoded in the odd number decoding section 220.

(7) Next, on a symbol 4 of slot 1, the output signal of the even number decoding section 219, which previously decodes data stored in the small scale storing section 215 at a region #4, and the power data P which is an output of the power extracting section 32 are subjected to the weighting averaging operation by the weighted averaging section 240. Then the weighted average data which is higher than the first threshold value and the corresponding address signal are stored in the small scale storing section 215 at an region #4. At the same time, in addition, the encoded data stored in the small scale storing section 215 at a region #6 is decoded in the even number decoding section 219.

(8) . . . (continued)

According to the conventional apparatus, the storing section requires ten symbols, i.e., 102,400 bit of memory capacity. However, owing to the circuit and operation design of the present invention, the small scale storing section requires merely 6,400 bit (640 bit×10 symbols) in a case where one region of the small scale storing section 215 has 640 bit of memory capacity On the other hand, each of the even number storing section and the odd number storing section needs a memory capacity for one symbol, that is, 10,240 bit×2=20,480 bit. According to the present invention, therefore, the apparatus requires as a whole 6,400+20,480 bit=26,880 bit only, which is about one-fourth of the memory capacity required in the conventional apparatus. Thus, the required memory capacity can be remarkably reduced.

Some examples of the preferred embodiments of the present invention are described above. However, the present invention is not limited to or by the scope of the foregoing disclosure. It is apparent to persons skilled in the art that various kinds of modifications or improvements may be made to the embodiments described above.

As described above, according to the present invention, the memory capacity and circuitry of the code division multiple access receiving apparatus can be reduced in size and scale. Further, the memory capacity required for encoding the data can be saved remarkably.

Further, according to the invention, the storing section merely stores therein the data higher than the first threshold value and the corresponding address signals. Therefore, the memory capacity can be reduced in size and scale remarkably.

Furthermore, according to the invention, the encoded data storing section stores therein a small memory size, and the data decoding section decodes the encoded data stored in the storing section to have the same size as the data originally has. Therefore, the data to be stored in the memory can be reduced greatly. As a result, the memory capacity for storing data and the circuitry of the receiver apparatus can be decreased in size and scale.

What is claimed is:

1. A received data signal filtering device for a mobile telephone system comprising:
   a filtering operation device which inputs a received radio signal containing a power data;
   a power data encoding device coupled to an output side of said filtering operation device for encoding part of a filtered data lower than a predetermined level, the power data encoding device producing an encoded data comprising a peak of said filtered data; and
   a memory section coupled between said filtering operation device and said power data encoding device, said memory section comprising an encoded data storing section and a filtered data storing section.

2. The received data signal filtering device according to claim 1, wherein said data encoding device comprises:
   a filtered data address generating section coupled to an input side of said filtered data storing section;
   a comparing section coupled to an output side of said filtered data storing section;
   a data holding section coupled to said comparing section and said filtered data storing section;
   an encoding operation section coupled to an output side of said comparing section and said filtered data storing section.

3. The received data signal filtering device according to claim 2, wherein said data encoding device further comprises:
   a last address detecting section coupled to an output side of said filtered data address generating section and an input side of said encoded data storing section;
   a selecting section coupled to an output side of said last address detecting section, an output side of said data holding section and an output side of said encoding operation section, and to an input side of said encoded data storing section; and
   an encoded data address generating section coupled to an output side of said comparing section and an input side of said encoded data storing section.

4. The received data signal filtering device according to claim 2, further comprising a data decoding device coupled to said memory section, said data decoding device comprising:
   a filtered data address generating section coupled to an input side of said filtered data storing section;
   a comparing section coupled to an output side of said filtered data address generating section; and
   an encoded data address generating section coupled to an output side of said comparing section and an input side of said encoded data storing section.

5. The received data signal filtering device according to claim 4, wherein said data decoding device further comprises:
   a filtered value holding section coupled to an output side of said encoded data storing section; and
   a selecting section coupled to an output side of said filtered data storing section, an output side of said comparing section, an output side of said filtered value holding section, and an input side of said encoded data storing section.

6. The received data signal filtering device according to claim 1, wherein said filtering operation device comprises an averaging operation section.

7. The received data signal filtering device according to claim 1, wherein said filtering operation device comprises a weighting operation section.

8. The received data signal filtering device according to claim 1, wherein the filtering operation device is installed in a mobile telephone.

9. The received data signal filtering device according to claim 1, wherein the filtering operation device is installed in a base transceiver station.

10. A received signal filtering device for a mobile telephone system, comprising:
    an filtering operation means for inputting received data containing a power data, filtering the inputted data and generating a filtered power data;
    a data encoding means for encoding a part of said filtered data lower than a predetermined level, said data encoding means producing an encoded data comprising a peak of said filtered data; and
    a memory section coupled between said filtering operation means and said data encoding means, said memory section comprising an encoded data storing section and a filtered data storing section.

11. A code division multiple access receiver apparatus for a mobile telephone system, comprising:
    a complex correlating device which inputs a received radio signal containing therein a power data;
    a power data extracting device coupling to an output side of said complex correlating device;
    a filtering operation device connecting to an output side of said power data extracting device;

a power data encoding device coupled to said filtering operation device;

a memory section coupled between said filtering operation device and said power data encoding device, said memory section comprising an encoded data storing section and a filtered data storing section;

a spread spectrum code signal generating device coupled to an input side of said complex correlating device; and a peak detecting device coupled to an output side of said filtering operation device.

12. The code division multiple access receiver apparatus according to claim 11, wherein said data encoding device comprises:

a filtered data address generating section coupled to said filtered data storing section;

a comparing section coupled to an output side of said filtered data storing device;

a data holding section coupled to an output side of said comparing section;

an encoding operation section coupled to an output side of said comparing means and said filtered data storing section.

13. The code division multiple access receiver apparatus according to claim 12, wherein said data encoding device further comprises:

a last address detecting section coupled to an output side of said filtered data address generating section and an input side of said encoded data storing section;

a selecting section coupled to an output side of said last address detecting section, an output side of said data holding section and an output side of said encoding operation section, and to an input side of said encoded data storing section; and an encoded data address generating section coupled to an output side of said comparing section and an input side of said encoded data storing section.

14. The code division multiple access receiver apparatus according to claim 12, further comprising a data decoding device coupled to said memory section, said data decoding device comprising:

a filtered data address generating section coupled to an input side of said filtered data storing section;

a comparing section coupled to an output side of said filtered data address generating section; and an encoded data address generating section coupled to an output side of said comparing section and an input side of said encoded data storing section.

15. The code division multiple access receiver apparatus according to claim 14, wherein said data decoding device further comprises:

a filtered value holding section coupled to an output side of said encoded data storing section; and a selecting section coupled to an output side of said filtered data storing section, an output side of said comparing section, an output side of said filtered value holding section, and an input side of said encoded data storing section.

16. The code division multiple access receiver apparatus according to claim 11, wherein said filtering operation device comprises an averaging operation section.

17. The code division multiple access receiver apparatus according to claim 11, wherein said filtering operation device comprises a weighting operation section.

18. The code division multiple access receiver apparatus according to claim 11, wherein the filtering operation device is installed in a mobile telephone.

19. The code division multiple access receiver apparatus according to claim 11, wherein the filtering operation device is installed in a base transceiver station.

20. A code division multiple access receiver apparatus, comprising:

complex correlation means for reverse spread spectrum modulating a received radio signal;

means for extracting a power data from an output signal of said complex correlation means;

means for filtering said power data extracted by said power data extracting means and generating a filtered power data;

means for encoding said filtered power data by filtering a part of said filtered power data lower than a predetermined value, said encoding means producing an encoded data comprising a peak of said filtered power data;

a memory section coupled between said means for filtering and said means for encoding, said memory section comprising an encoded data storing section and a filtered data storing section;

means for generating a spread spectrum code signal and outputting said spread spectrum code signal to said complex correlation means; and means for detecting a peak value of said encoded data.

21. A method of filtering received signals for a mobile telephone system, comprising steps of:

inputting received radio signal containing power data;

filtering the inputted data and generating a filtered power data;

encoding a part of said filtered power data lower than a predetermined level and producing an encoded data containing a power peak; and storing encoded data in a memory coupled between said filtering operation device and said power data encoding device, said memory section comprising an encoded data storing section and a filtered data storing section.

22. A radio communication system, comprising:

at least one base transceiver station;

at least one mobile terminal;

wherein at least one of said base transceiver station and said mobile terminal comprises a received signal filtering device, said received signal filtering device comprising:

a filtering operation device which inputs a received radio signal containing a power data;

a power data encoding device coupled to an output side of said filtering operation device for encoding part of a filtered data lower than a predetermined level, the power data encoding device producing an encoded data comprising a peak of said filtered data; and a memory section coupled between said filtering operation device and said power data encoding device, said memory section comprising an encoded data storing section and a filtered data storing section.

23. The radio communication system according to claim 22, wherein said data encoding device comprises:

a filtered data address generating section coupled to an input side of said filtered data storing section;

a comparing section coupled to an output side of said filtered data storing section;

a data holding section coupled to said comparing section and said filtered data storing section;

an encoding operation section coupled to an output side of said comparing section and said filtered data storing section.

24. The radio communication system according to claim 23, wherein said data encoding device further comprises:
- a last address detecting section coupled to an output side of said filtered data address generating section and an input side of said encoded data storing section;
- a selecting section coupled to an output side of said last address detecting section, an output side of said data holding section and an output side of said encoding operation section, and to an input side of said encoded data storing section; and
- an encoded data address generating section coupled to an output side of said comparing section and an input side of said encoded data storing section.

25. The radio communication system according to claim 23, further comprising a data decoding device coupled at least to said memory section, said data decoding device comprising:
- a filtered data address generating section coupled to an input side of said filtered data storing section;
- a comparing section coupled to an output side of said filtered data address generating section; and
- an encoded data address generating section coupled to an output side of said comparing section and an input side of said encoded data storing section.

26. The radio communication system according to claim 25, wherein said data decoding device further comprises:
- a filtered value holding section coupled to an output side of said encoded data storing section; and
- a selecting section coupled to an output side of said filtered data storing section, an output side of said comparing section, an output side of said filtered value holding section, and an input side of said encoded data storing section.

27. The radio communication system according to claim 22, wherein said filtering operation device comprises an averaging operation section.

28. The radio communication system according to claim 22, wherein said filtering operation device comprises a weighting operation section.

29. The radio communication system according to claim 22, wherein the filtering operation device is installed in a mobile telephone.

30. The radio communication system according to claim 22, wherein the filtering operation device is installed in a base transceiver station.

31. A radio communication system, comprising:
- at least one base transceiver station;
- at least one mobile terminal;
- wherein at least one of said base transceiver station and said mobile terminal comprises a code division multiple access receiver apparatus, said code division multiple access receiver apparatus comprising:
  - a complex correlating means for revere spread spectrum modulating a received radio signal containing therein a power data;
  - means for extracting a power data from an output signal of said complex correlation means;
  - means for filtering said power data extracted by said power data extracting means and generating a filtered power data;
  - means for encoding said filtered power data by filtering a part of said filtered power data lower than a predetermined value, said encoding means producing an encoded data;
  - a memory coupled between said filtering means and said encoding means, said memory comprising an encoded data storing section and a filtered data storing section;
  - means for generating a spread spectrum code signal and outputting said spread spectrum code signal to said complex correlation means; and
  - means for detecting a peak value of said encoded data.

* * * * *